(12) United States Patent
Hutchinson

(10) Patent No.: US 10,834,911 B2
(45) Date of Patent: Nov. 17, 2020

(54) BAIT CONTAINER AND VARIABLE DISPENSER

(71) Applicant: Medway Plastics Corporation, Long Beach, CA (US)

(72) Inventor: Richard E. Hutchinson, Lakewood, CA (US)

(73) Assignee: Medway Plastics Corporation, Long Beach, CA (US)

( * ) Notice: Subject to any disclaimer, the term of this patent is extended or adjusted under 35 U.S.C. 154(b) by 169 days.

(21) Appl. No.: 15/907,110

(22) Filed: Feb. 27, 2018

(65) Prior Publication Data

US 2018/0242566 A1  Aug. 30, 2018

Related U.S. Application Data

(60) Provisional application No. 62/465,017, filed on Feb. 28, 2017.

(51) Int. Cl.
*A01K 97/02* (2006.01)
*A01K 97/05* (2006.01)
*A01K 69/08* (2006.01)

(52) U.S. Cl.
CPC .............. *A01K 97/02* (2013.01); *A01K 69/08* (2013.01); *A01K 97/05* (2013.01)

(58) Field of Classification Search
CPC ......... A01K 97/02; A01K 97/04; A01K 97/05
See application file for complete search history.

(56) References Cited

U.S. PATENT DOCUMENTS

| 1,497,199 A | * | 6/1924 | Sutthoff | A47G 19/16 99/323 |
| 2,614,358 A | * | 10/1952 | Adams | A01K 97/05 43/55 |
| 2,713,744 A | * | 7/1955 | Strausser, Sr. | A01K 97/02 43/44.99 |
| 2,718,088 A | * | 9/1955 | Perry | A01K 97/04 43/55 |
| 2,719,382 A | * | 10/1955 | Schachte | A01K 95/00 43/44.99 |
| 2,729,912 A | * | 1/1956 | Moffett | A01K 97/02 43/44.99 |
| 2,883,788 A | * | 4/1959 | Stitt | A01K 97/04 43/55 |
| 3,842,529 A | | 10/1974 | Richard | |
| 4,143,479 A | | 3/1979 | Kingston | |
| 4,297,804 A | * | 11/1981 | Weld | A01K 97/05 43/55 |

(Continued)

FOREIGN PATENT DOCUMENTS

FR          1488709 A  *  7/1967  ............. A01K 97/02

OTHER PUBLICATIONS

Translation of FR 1488709 to Benezet (Year: 1966).*

*Primary Examiner* — Magdalena Topolski
*Assistant Examiner* — Morgan T Barlow
(74) *Attorney, Agent, or Firm* — Knobbe, Martens, Olson & Bear, LLP

(57) ABSTRACT

A container can dispense variable amounts of bait, for example, through holes in complementary sleeves. Different configurations can result in different hole sizes and different overlap in attachable sleeves. These differences can allow fishermen flexibility to better control the dispensing of bait and/or chum by varying the size of the openings.

13 Claims, 31 Drawing Sheets

(56) References Cited

U.S. PATENT DOCUMENTS

| | | | | |
|---|---|---|---|---|
| 4,563,832 A | | 1/1986 | Drebot | |
| 4,914,856 A | | 4/1990 | Kennedy | |
| 5,617,669 A | * | 4/1997 | Levey | A01K 97/02 43/42.06 |
| 6,138,400 A | * | 10/2000 | Gervae | A01K 97/02 43/44.99 |
| 6,301,824 B1 | * | 10/2001 | Ashlock | A01K 97/02 43/44.99 |
| 6,453,602 B1 | | 9/2002 | Russell et al. | |
| 6,711,849 B1 | * | 3/2004 | Moretti | A01K 97/02 43/44.99 |
| 7,152,363 B1 | * | 12/2006 | Garcia-Cruz | A01K 97/02 43/44.99 |
| 7,448,159 B2 | * | 11/2008 | Berge | A01K 85/01 43/42.06 |
| 7,631,613 B2 | * | 12/2009 | Lescroart | A01K 15/025 119/51.01 |
| 9,155,291 B1 | | 10/2015 | Russ | |
| 9,186,286 B2 | * | 11/2015 | Holstein | A61F 15/001 |
| 9,520,074 B2 | * | 12/2016 | Havens | A01K 75/00 |
| 9,596,831 B2 | * | 3/2017 | Christensen | A01K 15/025 |
| 10,390,517 B2 | * | 8/2019 | Wilson | A01K 5/02 |
| 10,524,453 B2 | * | 1/2020 | Stone | A01K 15/025 |
| 2008/0083378 A1 | * | 4/2008 | Pearce | A01K 5/0114 119/707 |
| 2010/0000142 A1 | * | 1/2010 | Thompson | A01K 97/01 43/4.5 |
| 2014/0053448 A1 | * | 2/2014 | Kapolnek | A01K 97/05 43/4.5 |
| 2016/0309691 A1 | * | 10/2016 | Ancona | A01K 97/02 |
| 2018/0103622 A1 | * | 4/2018 | Nelson, Jr. | A01K 83/06 |
| 2018/0228138 A1 | * | 8/2018 | Smelt | A01K 97/02 |

\* cited by examiner

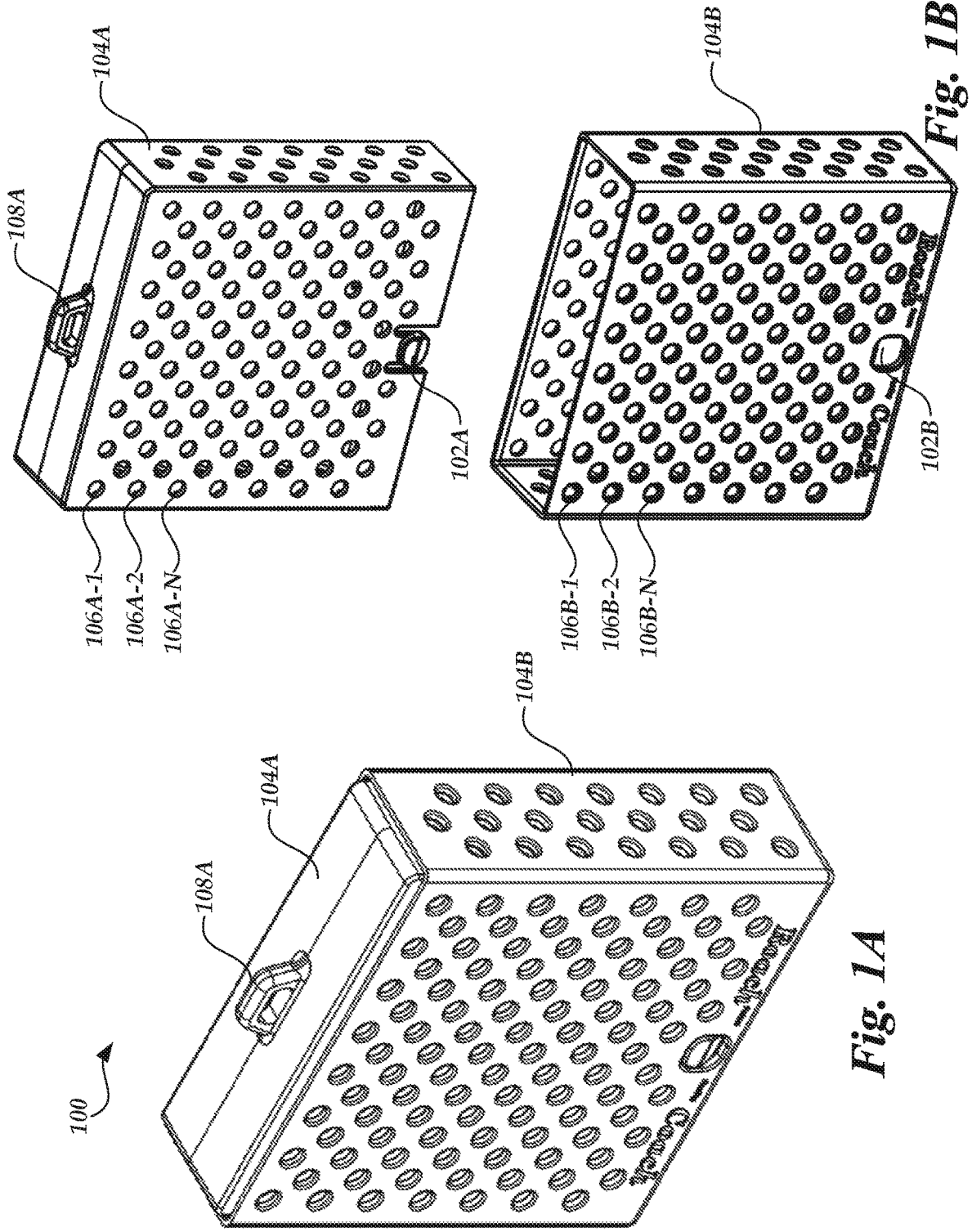

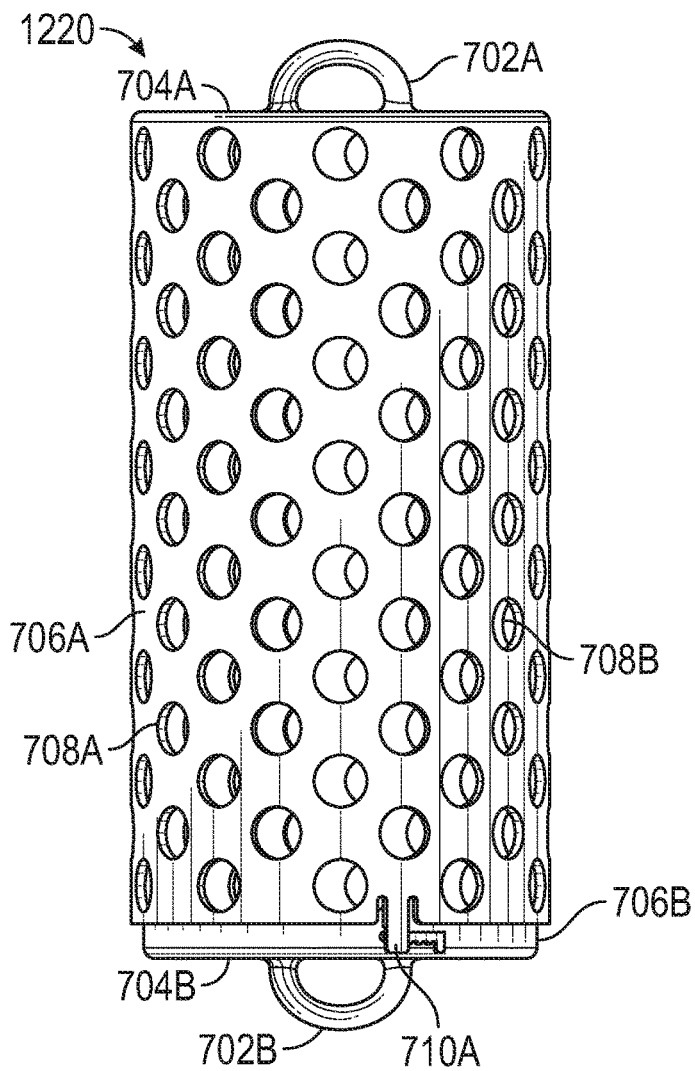
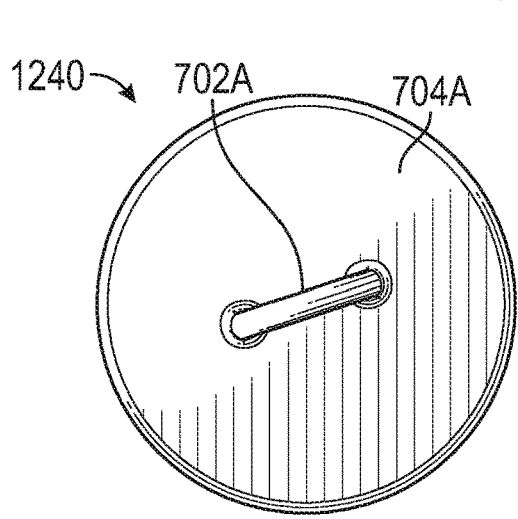
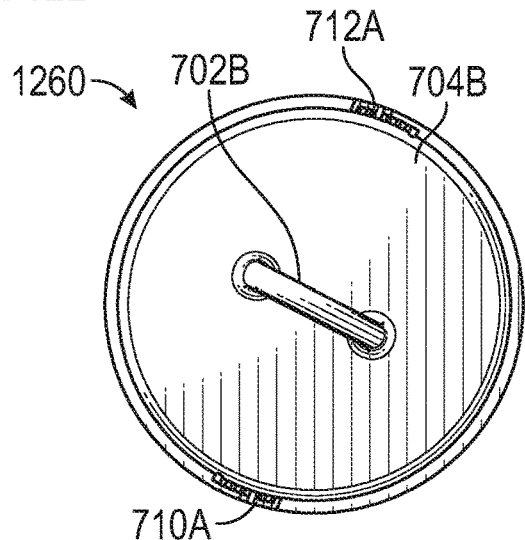
FIG. 12B
FIG. 12C
FIG. 12D

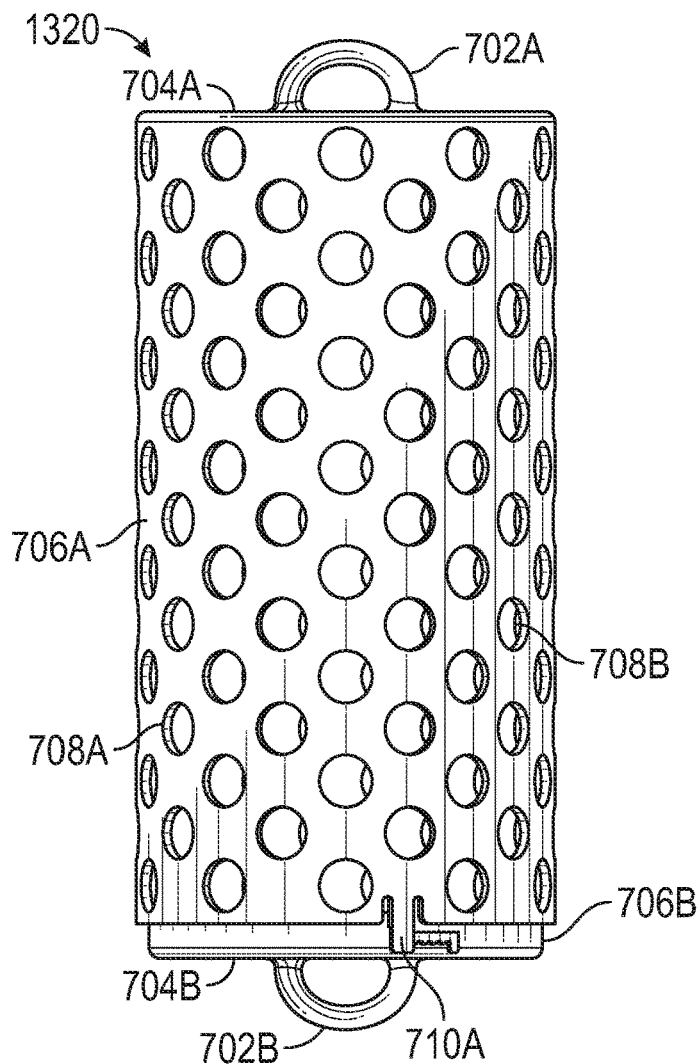
FIG. 13B
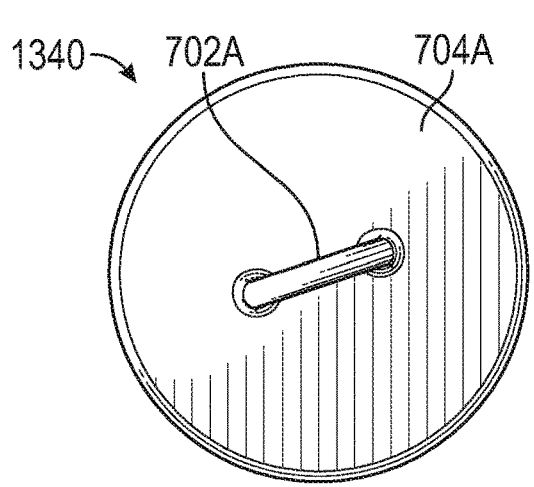
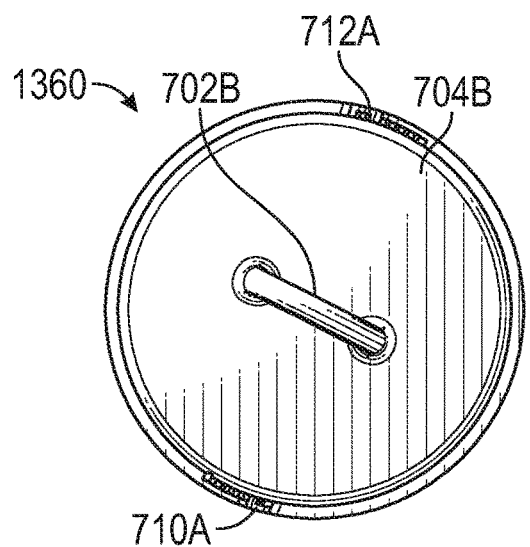
FIG. 13C     FIG. 13D

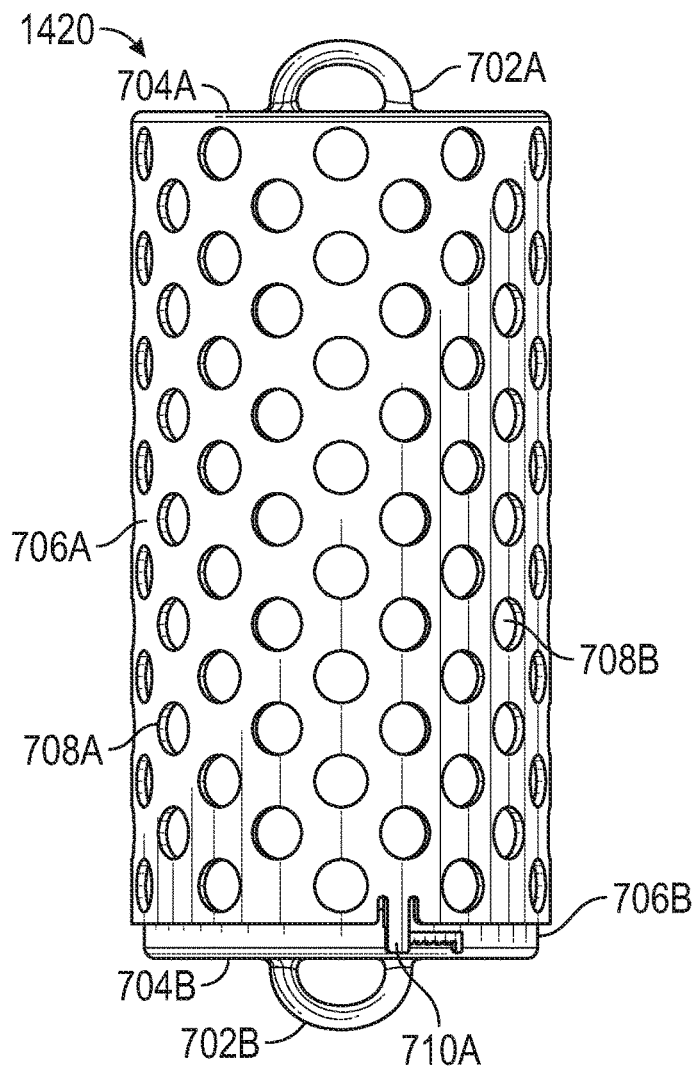
FIG. 14B
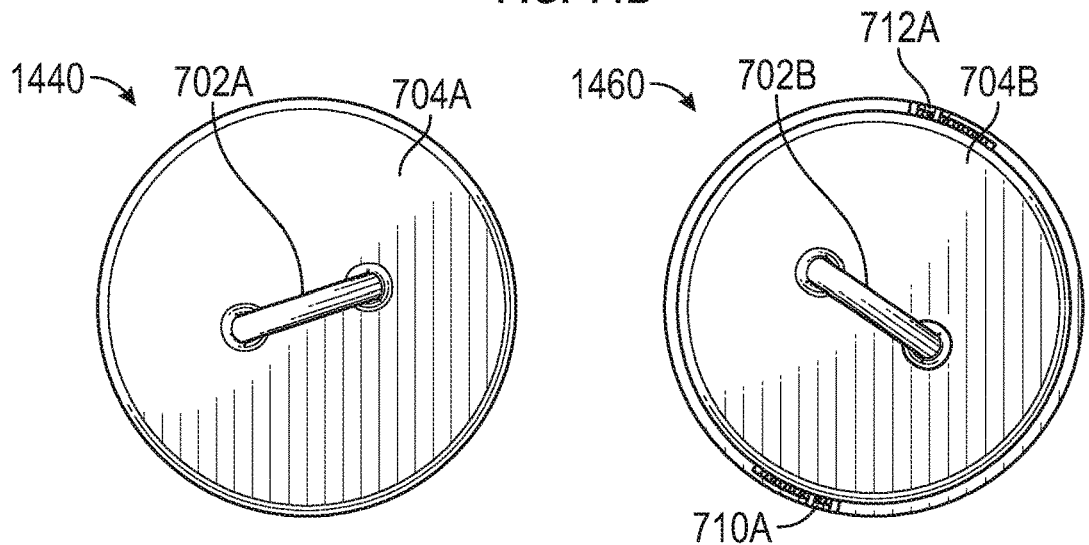
FIG. 14C  FIG. 14D

BAIT CONTAINER AND VARIABLE DISPENSER

CROSS REFERENCE TO RELATED APPLICATIONS

This application claims the benefit of U.S. Patent Provisional Application No. 62/465,017, filed Feb. 28, 2017. The entire contents of the foregoing application is hereby incorporated by reference for all that it contains and is made part of this specification.

FIELD

The current subject matter is directed to a container and/or dispenser.

DESCRIPTION OF RELATED ART

Crustaceans, such as lobsters, shrimp, or crabs, are often caught with a trap. The traps generally include bait tied to the trap, the bait selected to attract the type of crustaceans desired. However over time, the effectiveness of the bait is reduced. For example, the bait is often completely exposed within the trap and can be consumed by the crustaceans. The bait may also lose its attractive attributes (such as odor) over time or based on certain circumstances (such as a strong current). Thus, fishermen replace bait which requires more bait, thus increasing the cost for the fisherman and increasing the load on the ship. Furthermore, with reduced effectiveness of the bait, time and effort may be wasted for the fisherman when placing bait in traps that may no longer be as effective for attracting crustaceans.

Fishermen also attract fish through a process known as chumming. Chumming is a practice of luring various fishes by throwing chum off the side of the boat into the water. Chum often contains fish parts, bone, and blood, which attracts fish owing to fish's sense of smell. Fishermen want to use a minimum amount of bait while attracting the most amount of fish for the longest period of time. However, throwing such chum off the side of the boat may be ineffective as the chum may be quickly carried away by a strong current or the chum may release a burst of odor that quickly disperses over a short period of time.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various aspects of this invention provide advantages that include improved containment and/or dispensing of bait.

Some embodiments include a method for varying the rate of dispersion of bait including attaching a first and second attachable sleeve in a first configuration, wherein the first configuration includes overlapping openings of the first and second attachable sleeves to one degree; disengaging a first and second attachable sleeve; changing an orientation of the first attachable sleeve; and attaching the first and second attachable sleeve in a second configuration, wherein the second configuration includes attaching the first attachable sleeve in the changed orientation with the second attachable sleeve and overlapping openings of the first and second attachable sleeves to another degree.

Some embodiments include an bait container comprising: a first attachable sleeve; and a second attachable sleeve configured to be attached to the first attachable sleeve in a plurality of configurations; wherein the first configuration includes attaching the first attachable sleeve in one orientation to the second attachable sleeve, and the second configuration includes attaching the first attachable sleeve in a second orientation to the second attachable sleeve.

In some embodiments, the first configuration results in an effective opening for the bait container that is smaller than an opening on the first attachable sleeve.

In some embodiments, the first configuration results in an effective opening for the bait container that is smaller than both an opening on the first attachable sleeve and an opening on the second attachable sleeve.

In some embodiments, the first configuration results in an effective opening for the bait container that is smaller than that of the second configuration.

In some embodiments, at least one surface of the first attachable sleeve is round-shaped.

In some embodiments, at least one surface of the first attachable sleeve is rectangular-shaped.

In some embodiments, at least one surface of the first attachable sleeve is square-shaped.

In some embodiments, the sleeves comprise water proof material.

In some embodiments, the sleeves comprise Metal, ABS, or PVC.

In some embodiments, the sleeves dissolve over time.

In some embodiments, the bait container is used for at least one of: lobster fishing, crustacean fishing, hunting, salt water fishing, fresh water fishing, fishing in a lake, fishing in a river, offshore fishing, or inshore fishing.

In some embodiments, an electronic device controls the bait container.

In some embodiments, to control the bait container includes adjusting the first attachable sleeve and the second attachable sleeve between the first and second configurations.

In some embodiments, adjusting the first attachable sleeve and the second attachable sleeve between the first and second configurations is based on at least one of: the depth of the water, the type of bait, the type of prey, an environmental condition, the length of time passed, locational information, or a time.

In some embodiments, adjusting the first attachable sleeve and the second attachable sleeve between the first and second configurations is based on an input to adjust the release of bait odor.

In some embodiments, adjusting the first attachable sleeve and the second attachable sleeve between the first and second configurations is based on an input to adjust the particle distribution of the bait.

In some embodiments, an electronic device includes a camera to view the bait container.

In some embodiments, the first attachable sleeve is attachable using a lock mechanism, wherein the lock mechanism includes at least one of: a male/female interface, a clip, a zip tie, a fishing line, a twine, or a loop.

In some embodiments, a shape of the opening includes at least one of: a square, triangular, rectangular, oval, convex, concave, cyclic, equilateral, star, pentagon, octagon, trapezium, diamond, rhombus, parallelogram, hexagon, heptagon, nonagon, decagon, stadium, or arched.

For purposes of this summary, certain aspects, advantages, and novel features of the disclosure are described herein. It is to be understood that not necessarily all such advantages may be achieved in accordance with any particular embodiment. Thus, for example, those skilled in the art will recognize that certain embodiments may achieve one advantage or group of advantages as taught herein without necessarily achieving other advantages as may be taught or suggested herein.

DESCRIPTION OF THE DRAWINGS

FIG. 1A is a perspective view of an example bait container, according to one embodiment.

FIG. 1B is a perspective view of the example bait container of FIG. 1A with the two attachable sleeves separated, according to one embodiment.

FIGS. 12A-12D illustrate the example bait container of FIGS. 9A-9D with the first insert is rotated nine degrees from the second insert, according to one embodiment.

FIGS. 13A-13D illustrate the example bait container of FIGS. 9A-9D with the first insert is rotated twelve degrees from the second insert, according to one embodiment.

FIGS. 14A-14D illustrate the example bait container of FIGS. 9A-9D with the first insert is rotated fifteen degrees from the second insert, according to one embodiment.

Figure 2D:
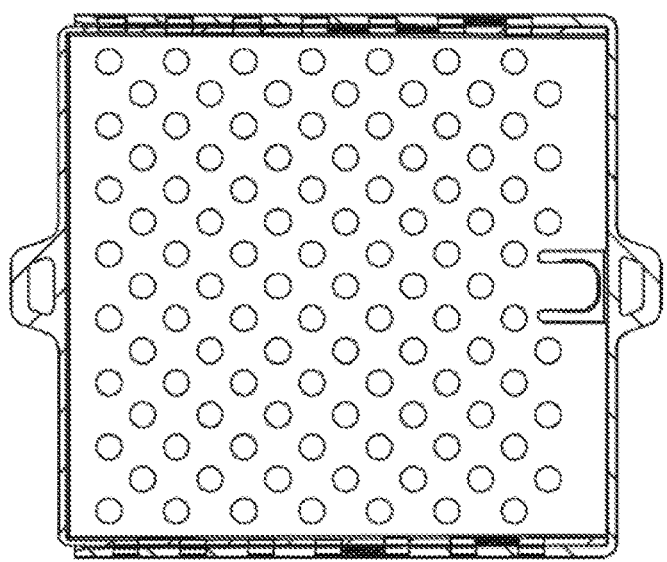
FIGS. 2A-2F illustrate one example configuration where the holes are substantially aligned together, according to one embodiment.
Figure 2F:
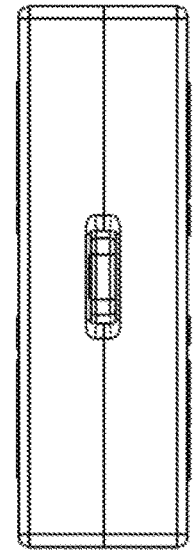

These and other features will now be described with reference to the drawings summarized above. The drawings and the associated descriptions are provided to illustrate certain embodiments and not to limit the scope of the invention. Throughout the drawings, reference numbers may be re-used to indicate correspondence between referenced elements. Note that the relative dimensions of the following figures may not be drawn to scale.

DETAILED DESCRIPTION

Various embodiments of systems, methods, processes, and data structures will now be described with reference to the drawings. Variations to the systems, methods, processes, and data structures which represent other embodiments will also be described. Although several embodiments, examples and illustrations are disclosed below, the embodiments described herein extend beyond the specifically disclosed embodiments, examples and illustrations and includes other uses of the inventions and modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, various embodiments can comprise several novel features and no single feature is solely responsible for its desirable attributes or is essential to practicing the inventions herein described.

Some embodiments of the present disclosure describe a bait container, including attachable sleeves. The attachable sleeves may include openings, such as holes, such that when the attachable sleeves are attached in one configuration, the openings may overlap to a certain degree. The attachable sleeves can disengage and be reattached in a different configuration. In the different configuration, the openings may overlap to a different degree. For example, in one configuration (the first configuration), the holes may overlap completely such that the full size of the holes can be used to release the bait odor to the full extent allowed by the hole sizes and to allow more of the bait to escape from the bait container. In a different configuration (the second configuration), the holes may only overlap half way effectively creating smaller openings between the bait and external to the bait container, such that the bait can be preserved for a longer duration of time by allowing the bait odor to be released from a smaller opening and allow less bait to escape by reducing the size of the escape hole.

This type of bait container can provide a robust, multi-purpose, and adaptable bait container for a variety of different circumstances. For example, fishermen may use different types and sizes of bait for different type of fish. For larger bait or chum, a configuration resulting effectively in larger openings can be used to release more of the odor and allowing more of the smaller pieces of bait and chum to be released. For smaller bait or chum, a different configuration with overlap in openings that effectively result in smaller holes can be used to slow the rate of escape of the small bait or chum from the bait container. In some embodiments, the bait container includes a mesh, weaver, and/or the like to prevent bait from escaping. The mesh can be embedded covering the hole.

In some embodiments, the bait container can include an electronic device configured to control the bait container. For example, the electronic device can control and/or adjust the size of the holes by rotating one or more of the inserts. The electronic device can include a camera to view the bait container. The electronic device can include a processor that automatically adjusts the size of the holes. For example, the electronic device can adjust the size of the holes based on the depth of the water, the type of the bait, the type of the fish, the water conditions, the speed of the current, conditions of the environment, conditions of the prey, conditions of the bait, length of time passed, locational information, time period, season for catch, and/or the like. The electronic device can include a global positioning system and/or an inertial sensor.

Allowing such configuration of a bait container improves the profit margin of a fisherman that may otherwise have a single type of bait container by attracting fish more effectively over a longer period of time, thus reducing boat operating time. This may reduce the fisherman's wasted time and effort using bait in a container that has already lost its effectiveness. Some embodiments of the present disclosure include a bait container that can keep bait effectiveness higher for longer periods of time. The fisherman's catch per trap efficiency improves, thus improving profitability and profit margin. Furthermore, having a single adjustable bait container reduces the need to store and use different types of bait containers, thus reducing boat load.

An adjustable bait container also helps to customize the bait container in response to varying circumstances. For example, in more turbulent weather or heavy current levels, the fisherman may use the second configuration to reduce the rate of release of the bait or chum. This is advantageous because at heavier current levels, the bait may be push against the container speeding its release, and may also affect the rate of odor release. Allowing a fisherman to create smaller effective openings can help preserve the bait longer in heavy current conditions.

Generally, chum is tossed from the side of the boat that can be taken far from the boat with the current or fall to the ocean sea. However, the bait container of some embodiments of the present disclosure allow the fisherman to adjust the depth of the chum or bait using the bait container based on an ideal depth of the fish or avoiding certain terrain, thus improving the effectiveness of fishing catches. The fisherman may also maintain a particular distance (or radius) from the boat that the chum or bait can travel to, thus maintaining the attractiveness of the bait close to the boat.

In some embodiments, the bait container can be used for a variety of different uses. For example, the bait container can be used for lobster fishing, other crustacean fishing, hunting, salt water fishing, fresh water fishing, fishing in a lake, fishing in a river, offshore fishing, inshore fishing, and/or the like. The bait container can be adjustable to fit to current conditions. For example, the bait container can be adjusted to release bait odor and/or particle distribution to attract a targeted species of fish/animal to the source.

Attachable Sleeves

In FIG. 1A, an example bait container 100 is shown where the bait is enclosed within. In FIG. 1B, a perspective view of the example bait container 100 of FIG. 1A with the two attachable sleeves 104 separated is shown. The bait container 100 may include two attachable sleeves 104A and 104B (collectively referred to herein as "104"), a locking device 102A and 102B (collectively referred to herein as "102") on the attachable sleeves 104, openings 106A-1, 106A-2, 106A-N, 106B-1, 106B-2, 106B-M (collectively referred to herein as "106") located on the surfaces of the attachable sleeves 104, and hooks 108A, 108B (collectively referred to as "108").

The two attachable sleeves 104 may be attached together to form the bait container 100. The first attachable sleeve 104A is inserted into the second attachable sleeve 104B such that the first attachable sleeve 104A forms the inner shell of the bait container 100 and the second attachable sleeve 104B forms the outer shell of the bait container 100. In some embodiments, the two piece inner and outer container formed by the two attachable sleeves 104A, 104B enhances strength and durability of the bait container.

The examples of FIGS. 1A and 1B show the two attachable sleeves 104 attached by the locking devices 102. The locking device 102A which is shown to be a sliding protrusion on the first attachable sleeve 104A that slides into a slot engagement, which is the second locking device 102B of the second attachable sleeve 104B. Once the sliding protrusion of the first attachable sleeve 104 slides into the slot engagement of the second attachable sleeve 104B, the two attachable sleeves 104 are attached together to form the bait container 100.

Locking Mechanism

The locking device 102 may be used to disengage the two attachable sleeves. For example, the sliding protrusion of the first attachable sleeve 104A in FIGS. 1A and 1B can be pushed in to disengage with the slot engagement of the second attachable sleeve 104B. Then the two attachable sleeves 104 can be pulled apart for further configuration and bait replacement.

In some embodiments, a different locking mechanism is used to connect the attachable sleeves 104, such as a snap fit joint, a hook and hook receiver, a string or line of one attachable sleeve to tie to another attachable sleeve, an external lock mechanism, a male/female interface, a clip, a zip tie, a fishing line, a twine, a loop, other locking mechanisms, and/or the like. The embodiment of FIGS. 1A and 1B show a single locking device 102 on each of the attachable sleeves 104 in a particular location that engages upon attachment. However, it is appreciated that a different number and/or different locations of locking devices 102 can be used to attach the attachable sleeves 104. To illustrate, the locking devices may instead be located on the ends of the attachable sleeves 104 such that the attachable sleeves 104 connect at the ends instead of inserting one of the attachable sleeves 104A into the other attachable sleeve 104B.

Container and Openings

The attachable sleeves 104 that are attached to create the example bait container 100 are shown to be of a rectangular shape. However, it is appreciated that the bait container 100 may be of a square, round, hexagonal, pyramidal, cylindrical, spherical, cube, cone, prism, frustum, cuboid, hemisphere, dodecahedron, hexagonal prism, tetrahedron, octahedron, and/or the like. Furthermore, a different number of attachable sleeves 104 can be used to be connected to form the bait container 100. In some embodiments, the attachable sleeves 104 can attach by sliding, rotating, reflecting, gliding, flipping, extending, flexing, pivoting, saddling, hinging, and/or the like.

The two attachable sleeves 104 may include openings (or holes) 106 on the surface of the attachable sleeves 104. The examples shown in FIGS. 1A and 1B illustrate the openings 106 on four surfaces for each attachable sleeve 104. However, it is appreciated that the holes 106 can be on a different number of surfaces and form a different pattern of holes 106 on the surfaces. The holes are illustrated as circles. However, it is appreciated that the holes may be square, triangular, rectangular, oval, convex, concave, cyclic, equilateral, star, pentagon, octagon, trapezium, diamond, rhombus, parallelogram, hexagon, heptagon, nonagon, decagon, stadium, arched, a portion thereof, and/or the like. Based on the alignment of the holes 106 when the two attachable sleeves 104 are locked together, the hole shape can differ. FIGS.

Figure 2C:
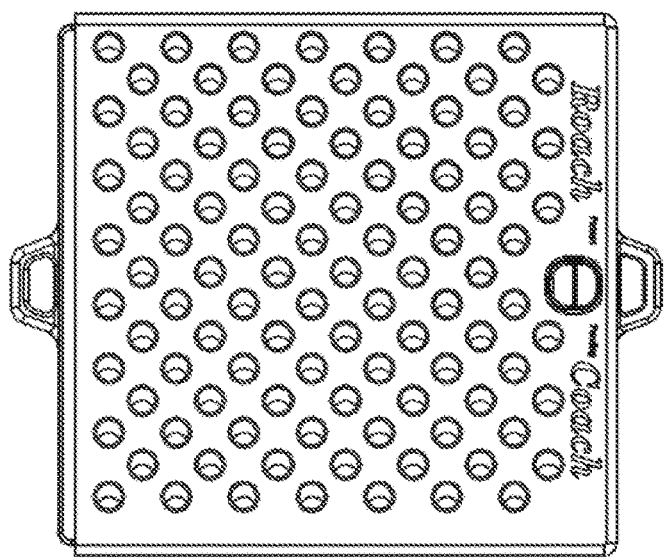
Figure 2E:
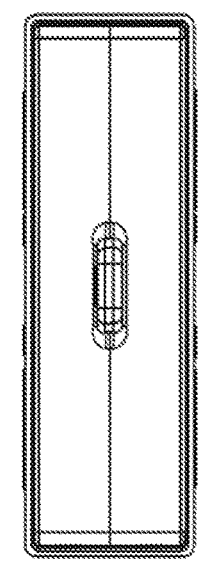
Figure 2B:
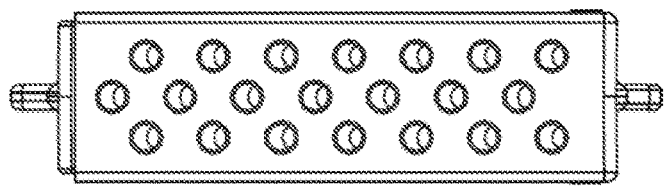
Figure 2A:
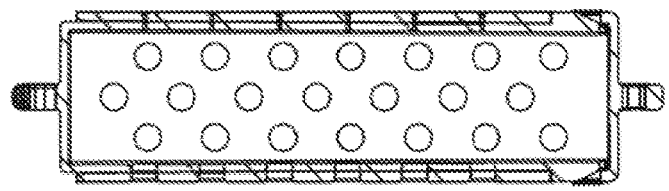

2A-2F illustrate one example configuration where the holes 106 are substantially aligned together such that size of the opening from the bait to the outside of the bait container is substantially the same. In this configuration, the full size of the opening 106 is utilized to release odor and preserve the bait. FIG. 2A illustrates a left perspective, FIG. 2B shows a right perspective, FIG. 2C a top perspective, FIG. 2D a bottom perspective, FIG. 2E a front perspective, and FIG. 2F a back perspective. Although the example embodiments of FIGS. 2A-2F illustrate holes 106 on the left, right, top, and bottom of the attachable sleeves, it is appreciated that the holes may be placed on different surfaces. As can be seen, in FIGS. 2A and 2D, the openings 106A of the first attachable sleeve 104A and the openings 106B of the second attachable sleeve 104B are fully overlapped, such that the effective opening of the bait container 100 is relatively large. FIGS. 2B and 2C illustrate a partial overlap in the openings 106A, 106B of the first and second attachable sleeve 104A, 104B. It is appreciated that different effective openings can be realized on different surfaces, as well as for individual openings on the surfaces.

Figure 3A:
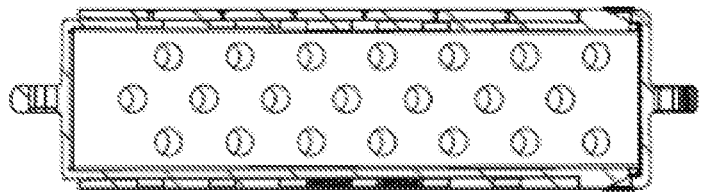
FIGS. 3A-3F illustrate another example configuration where the holes are not aligned, according to one embodiment.
Figure 3B:
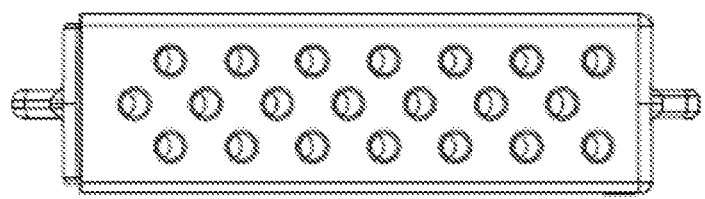
Figure 3C:
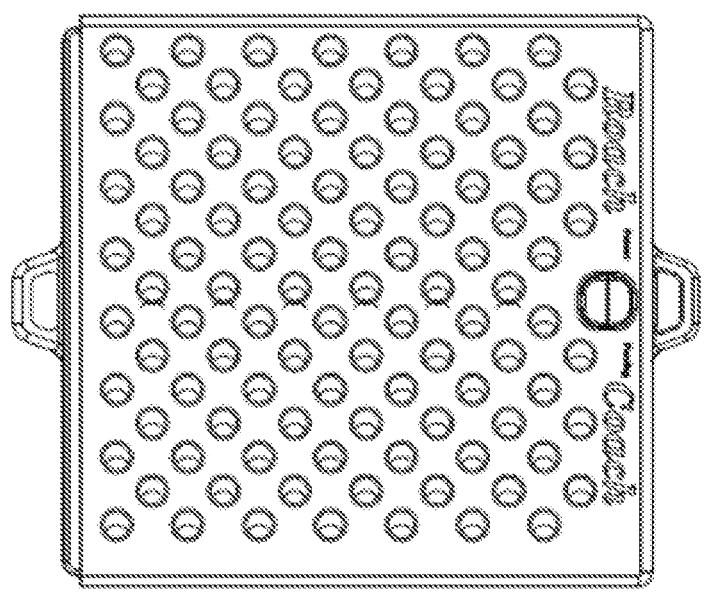
Figure 3D:
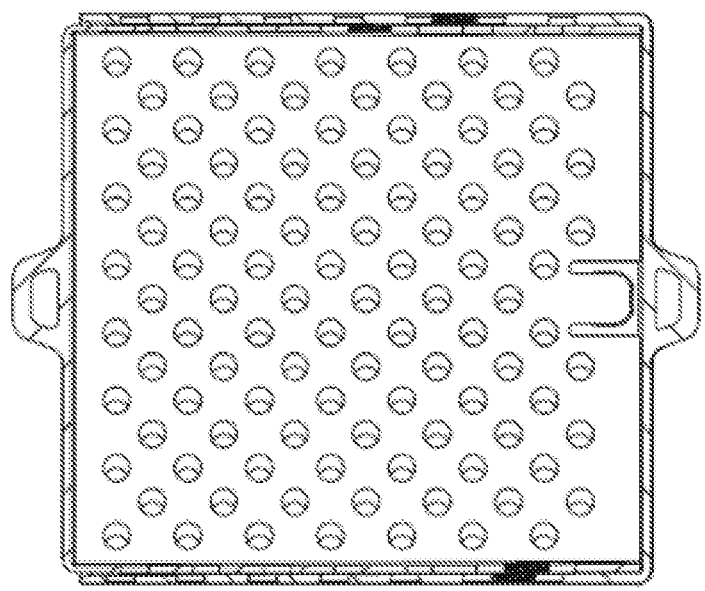
Figure 3E:
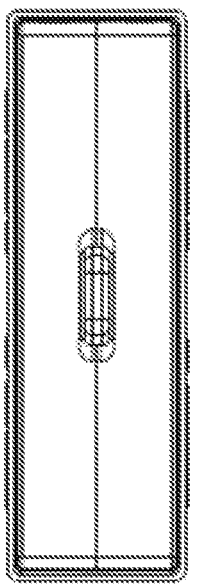
Figure 3F:
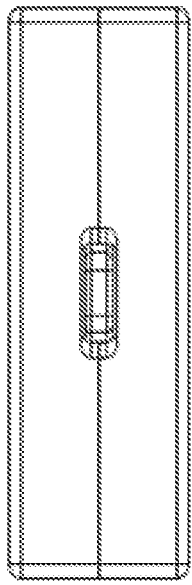

FIGS. 3A-3F illustrate another example configuration where the holes 106 are not fully aligned, such that the effective opening is smaller. Thus, the bait inside the bait container 100 is only exposed to the outside of the bait container 100 by the amount of area where the holes overlap. FIG. 3H illustrates a close-up of the hole alignment of FIGS. 3A-3F. The hole on the first attachment piece 104A and the of the second attachment piece 104B can partially overlap such that the portion where the two holes overlap 306 is the effective size of the opening that the bait is exposed to externally to the bait container 100. This is because part of the hole 106A of the first attachment sleeve 104A can be covered by the second attachment sleeve 104B, and/or vice versa. FIG. 3A illustrates a left perspective, FIG. 3B shows a right perspective, FIG. 3C a top perspective, FIG. 3D a bottom perspective, FIG. 3E a front perspective, and FIG. 3F a back perspective. As can be seen, in FIGS. 3A and 3D, the openings 106A of the first attachable sleeve 104A and the openings 106B of the second attachable sleeve 104B are partially overlapped, such that the effective opening of the bait container 100 is relatively smaller than the opening shown in FIGS. 2A and 2D. in FIGS. 3B and 3C, the openings 106A, 106B are partially overlapped. Thus, the openings 106A, 106B can result in the same effective opening as FIGS. 2B and 2C.

In some embodiments, the bait container 100 may be loaded with bait and frozen ready for immediate use. The bait container 100 may be made with metal, plastic, acrylonitrile butadiene styrene (ABS), polyvinyl chloride (PVC), plastic tubing, ABS plastic sheets, fiberglass, any waterproof material, biodegradable material, plant-based material, oil and/or gas derivatives, metals that dissolve in salt and/or fresh water, materials with less density than water or other liquid to allow the material to sink, and/or the like. The bait container 100 may be constructed of waterproof material. The bait container 100 can be constructed of salt water soluable thermoplastic resins that dissolve over time. The bait container 100 can be made of a metal and/or a plastic.

Container Adjustability

The alignment of the holes can be adjusted by changing the configuration of the attachable sleeves 104. For example, when both attachable sleeves 104 are attached face up, then the holes may align as shown in FIGS. 2A-2F. However when one attachable sleeve 104A is face up and the second attachable sleeve 104B is face down, then the two attachable sleeves 104 are locked together and the hole alignment may be such that the holes overlap 306 as shown by FIGS. 3A-3H. The alignment of the holes can be pre-configured to overlap anywhere from 0 to 100% of the hole size.

Although the example of FIGS. 2A-3F illustrate two configurations showing varying hole overlap, the attachable sleeves 104 may be configured to create a different number of hole overlap configurations for higher customization of bait use. For example, the attached pieces 104 may attach to form a square shape, allowing six different configurations. In another example, the attached pieces 104 may attach to for a spherical shape, allowing for a further number of configurations.

Container Hook

The attachable sleeves 104 may contain hooks 108 that can be used to attach an external component. For example, a hook 108 may be used to attach a line, rope, or zip ties. The hook 108 may be used to be attached to a crustacean trap, such that by tying a line on the hook 108 and to the frame of the trap. The hook 108 may also be used to attach to a line from a fishing boat. Attaching such a line may allow a fisherman to determine the depth or radius at which to keep the chum and/or bait. The hook 108 may also be used to tie a weight to keep the bait container steady 100.

Bait Container in the Crustacean Trap

Figure 4:
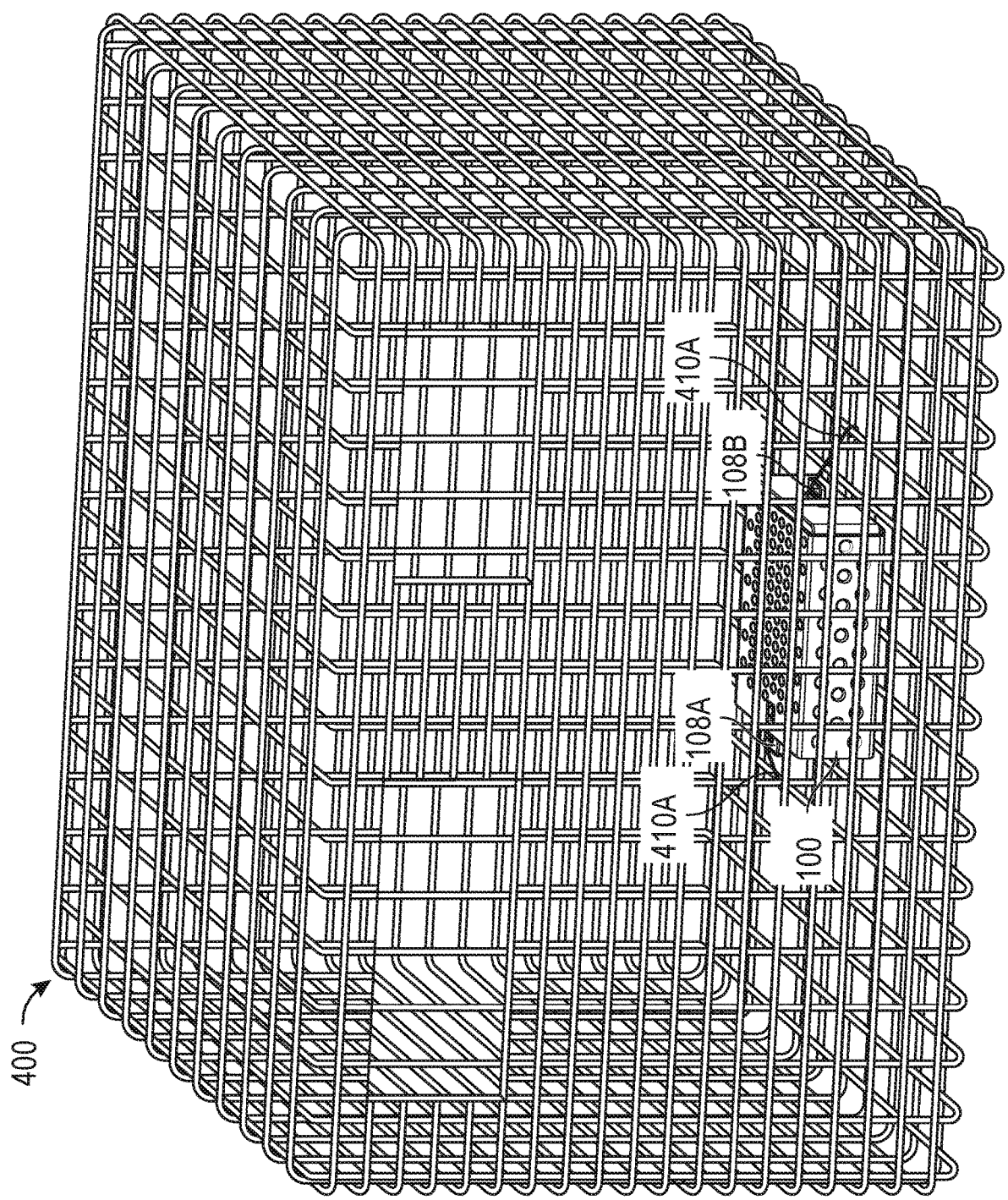
FIG. 4 illustrates an example bait container used in a crustacean trap, according to one embodiment.

FIG. 4 illustrates an example bait container used in a crustacean trap, according to one embodiment. The bait container 100 may contain bait used to attract crustaceans. The bait container 100 may be tied to the center of the crustacean trap 400 using a tying mechanism. For example, a line 410A, 4108 may be tied to the hooks 108A, 1088 of the bait container 100 to one of the wires of the crustacean trap 400.

Depending on the size of the crustacean, either the first or second configuration can be used for this example bait container 100. The crustacean can be attracted into the trap 400 by the odor and the release of small pieces of bait, but may be prevented from access to the larger pieces of bait in the container 100. This would allow the fishermen to use of the bait for a longer period of time.

In some embodiments, a loop (and/or other locking mechanism) on one or more ends of the bait container 100 can be used for attachment to the crustacean trap 400, a net, a cage, a line, a weight, and/or the like. In some embodiments, the bait container 100 can include a loop (and/or other locking mechanism) that is molded into the bait container 100, eye bolts, cable, and/or other device designed to attach to both ends of the container.

Although this embodiment illustrates the trap as a cage, the bait container 100 may be used in other types of catching devices, such as traps, nets, or the like.

Chum Container for Fishing

Figure 5:
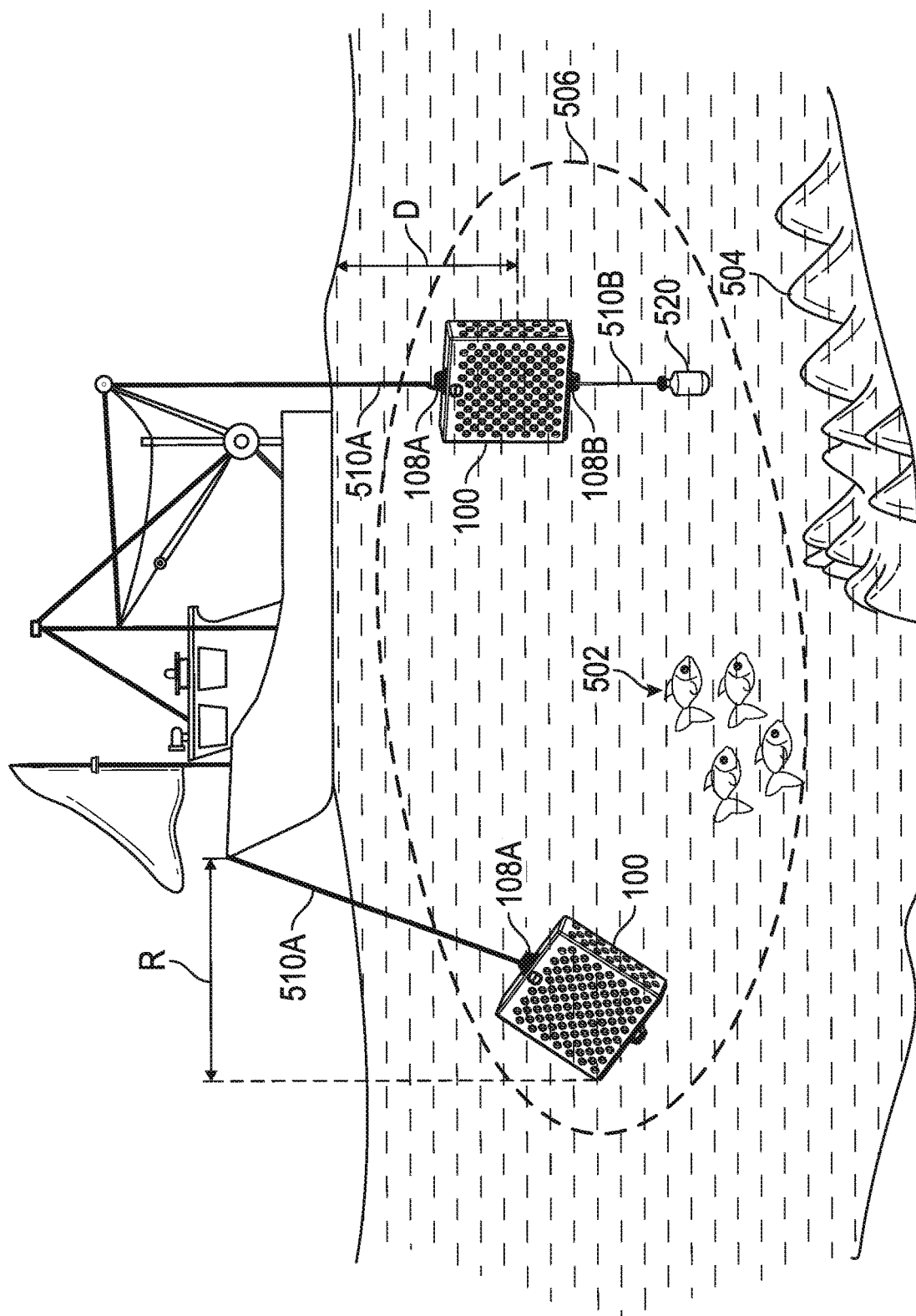
FIG. 5 illustrates an example bait container used for attracting fish, according to one embodiment.

FIG. 5 illustrates an example bait container (or chum container) 100 used for attracting fish, according to one embodiment. The bait container 100 may contain chum used to attract large groups of fish 502. The bait container 100 may be tied to a line 510A via the hooks 108 of the bait container. The fishermen can use the line 510A to control the depth D at which the bait container 100 stays. The fishermen can use such depths to navigate around difficult terrain. For example, the bait container 100 may attract fish higher than a ledge 504 such that the fishermen can more effectively catch fish where there is a lack of terrain 506. A weight 520 may be connected by a line 5108 to the other hook 108 of the bait container 100 to keep the bait container steady below the boat.

The bait container 100 may also be used to control the area where the fish are attracted to. Instead of chum thrown off the side of the boat that can be taken by current, the bait container 100 may be constricted by the line connected to the hook 108 to stay within a certain radius R from the boat. Thus, the fish are attracted to a closer area of the boat for effective fishing.

These two embodiments are two examples of the uses of the bait container 100. The bait container 100 may be used in other circumstances. For example, the bait container 100 maybe used as a feeder for live bait kept in a receiver.

Flow Diagram

Figure 6:
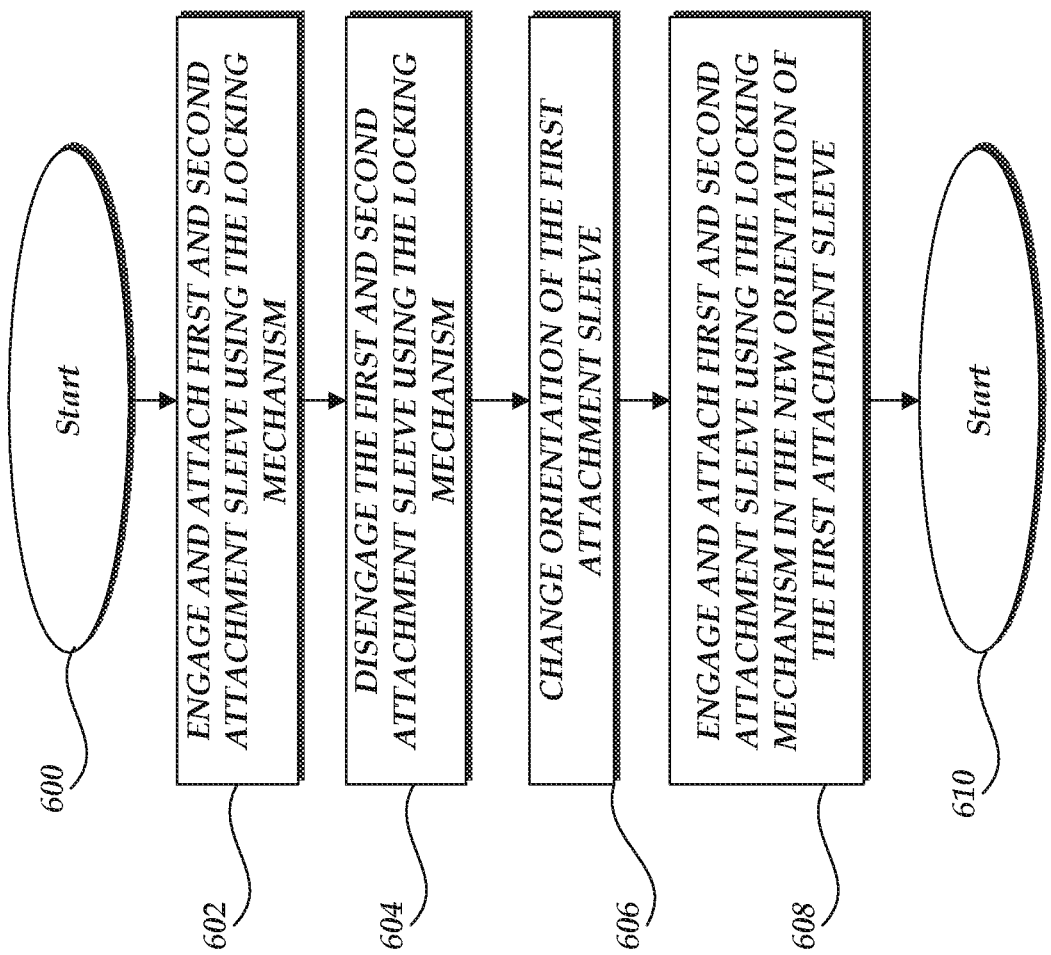
FIG. 6 provides an illustrative data flow example for changing from one hole overlap configuration to another hole overlap configuration, according to one embodiment.

FIG. 6 provides an illustrative data flow example for changing from one hole overlap configuration to another hole overlap configuration, according to one embodiment. The process starts at block 600 where the two attachable sleeves 104 are separated. At block 602, the locking device 102A of the first attachable sleeve 104A is a sliding protrusion that slides into a slot engagement of the second attachable sleeve 104B. The sliding protrusion of the first attachable sleeve 104A may be on the top and bottom surfaces, and the slot engagement of the second attachable sleeve 104B may also be on the top and bottom surfaces, such that the first attachable sleeve 104A may engage with the second attachable sleeve 104B when the first attachable sleeve 104A is either right-side up or up-side down. In this first configuration, the openings 106 of the two attachable sleeves 104 overlap in a particular configuration.

At block 604, the disengaging mechanism is used to disengage the slot engagement of the first and second attachable sleeves 104, separating the attachment pieces 104. At block 606, the orientation of the first attachment piece 104A is changed. One example of changing the orientation is to place the first attachment piece 104 upside down. At block 608, the locking device 102A of the first attachable sleeve 104A is a sliding protrusion that slides into the slot engagement of the second attachable sleeve 104B. In this second configuration, the openings 106 of the two attachable sleeves 104 overlap in a different configuration.

Bait Container with Rotatable Inserts

Figure 7A:
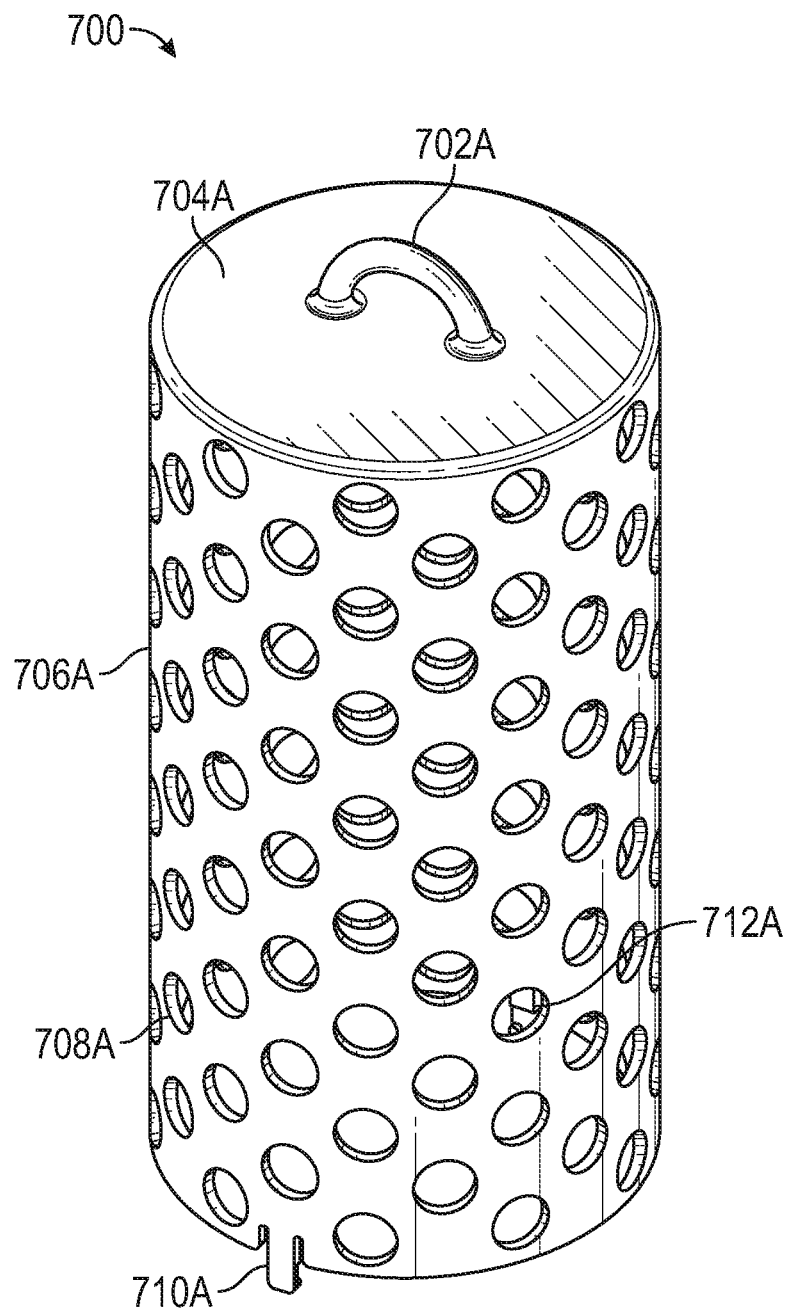
FIGS. 7A-7D illustrate an example of a first insert of a bait container, according to one embodiment.
Figure 7B:
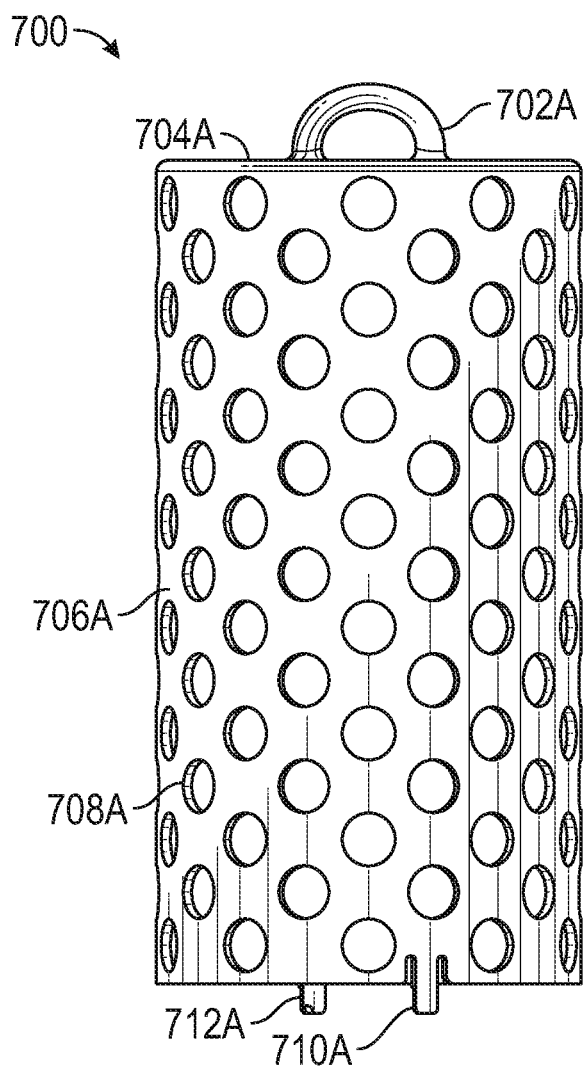
Figure 7C:
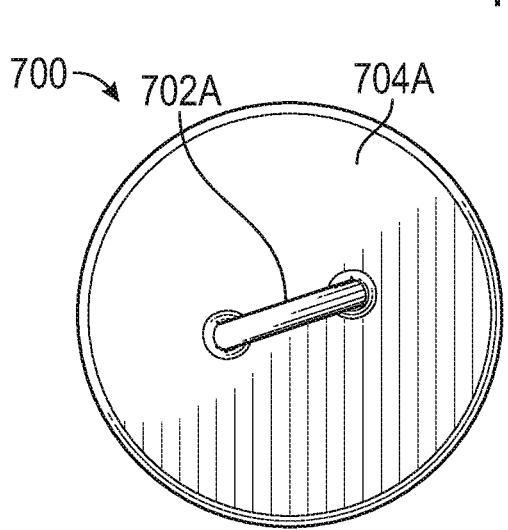
Figure 7D:
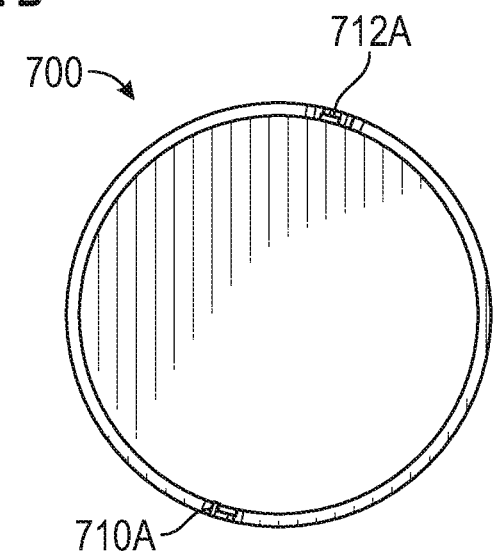

FIGS. 7A-7D illustrate an example of a first insert of a bait container, according to one embodiment. FIG. 7A illustrates a perspective view of the first insert of the example bait container according to one embodiment. FIG. 7B illustrates a front view of the first insert of the example bait container according to one embodiment. FIG. 7C illustrates a top view of the first insert of the example bait container according to one embodiment. FIG. 7D illustrates a bottom view of the first insert of the example bait container according to one embodiment. The first insert 700 can include a handle 702A, a top surface 704A, a side surface 706A, holes 708A on the side surface 706A, and two locking mechanisms 710A and 712A.

Figure 8A:
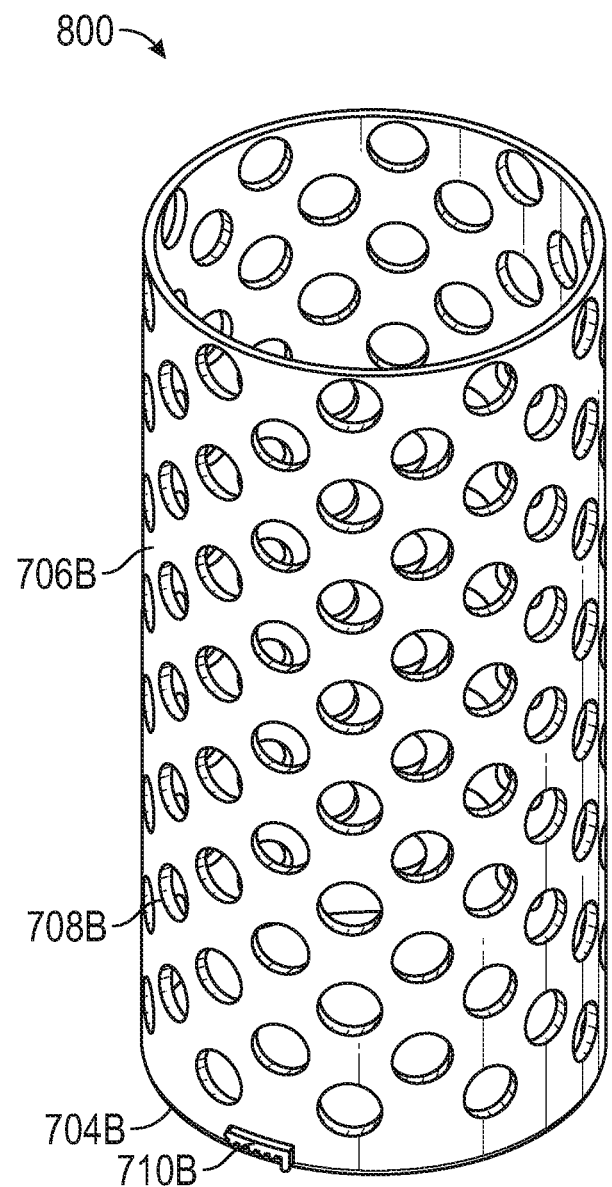
FIGS. 8A-8D illustrate an example of a second insert of a bait container, according to one embodiment.
Figure 8B:
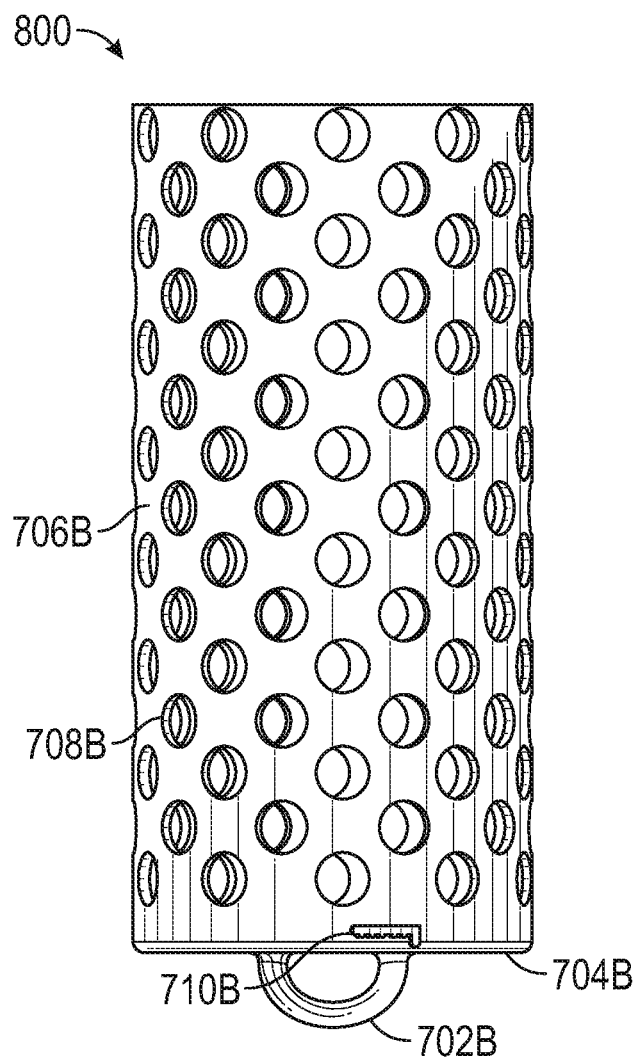
Figure 8C:
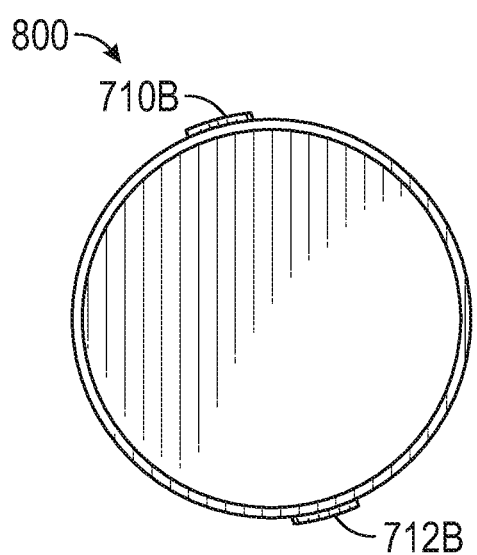
Figure 8D:
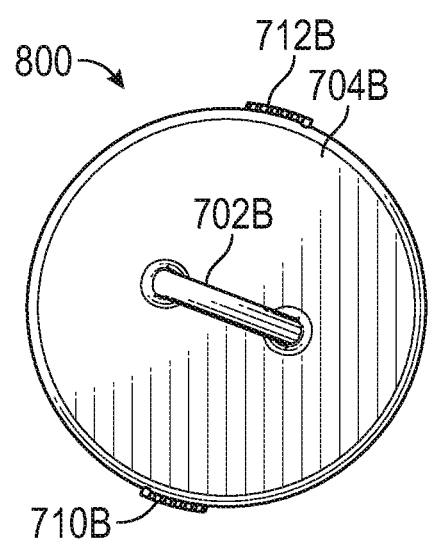

FIGS. 8A-8D illustrate an example of a second insert 800 of a bait container, according to one embodiment. FIG. 8A illustrates a perspective view of the second insert of the example bait container according to one embodiment. FIG. 8B illustrates a front view of the second insert of the example bait container according to one embodiment. FIG. 8C illustrates a top view of the second insert of the example bait container according to one embodiment. FIG. 8D illustrates a bottom view of the second insert of the example bait container according to one embodiment. The second insert can include a handle 702B, a bottom surface 704B, a side surface 706B, holes 708B on the side surface 706B, and two locking mechanisms 710B and 712B.

Figure 9A:
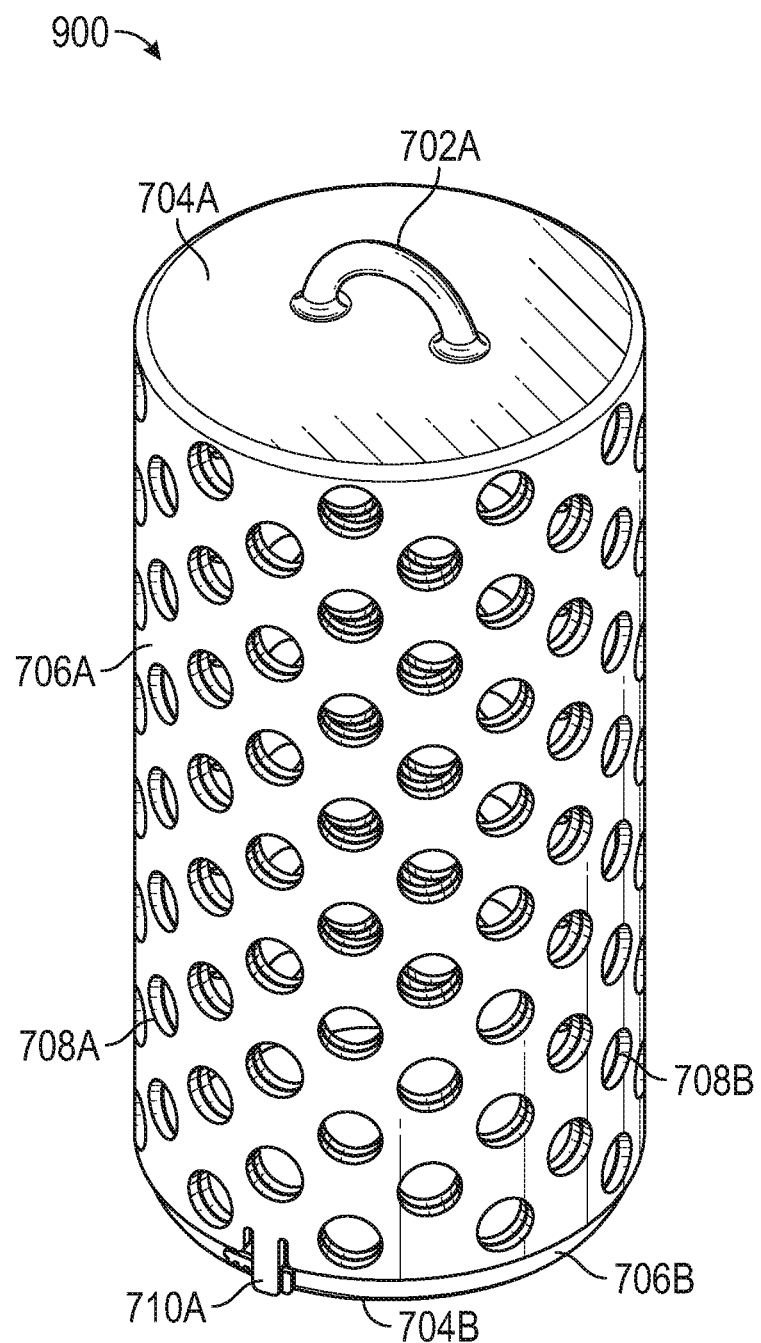
FIGS. 9A-9D illustrate an example bait container with the first and second inserts, where the holes are substantially aligned together, according to one embodiment.
Figure 9B:
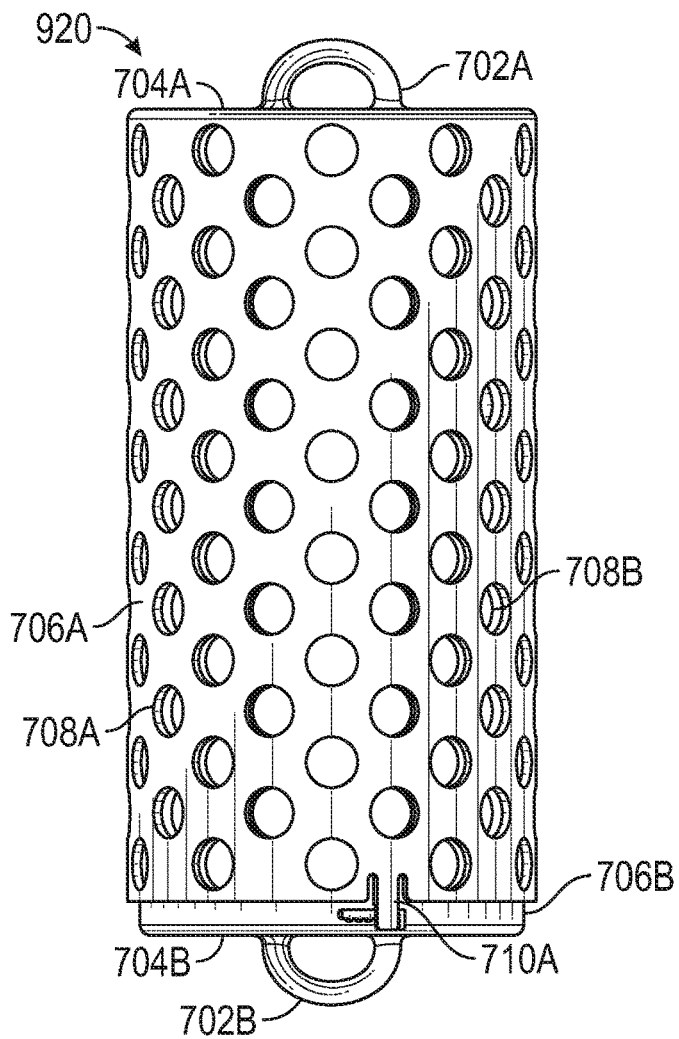
Figures 9C, 9D:
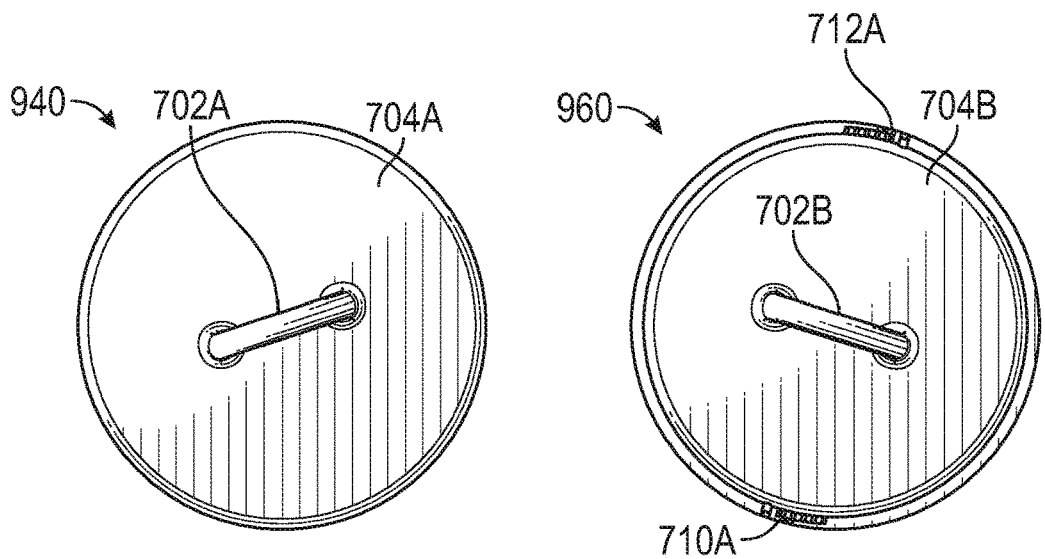

FIGS. 9A-9D illustrate an example bait container with the first and second inserts, where the holes are substantially aligned together, according to one embodiment. FIG. 9A illustrates a perspective view of the example bait container according to one embodiment. FIG. 9B illustrates a front view of the example bait container according to one embodiment. FIG. 9C illustrates a top view of the example bait container according to one embodiment. FIG. 9D illustrates a bottom view of the example bait container according to one embodiment. As shown in FIGS. 9A-9D, the first insert 700 and the second insert 800 can be aligned such that the holes are substantially aligned together.

Figure 10A:
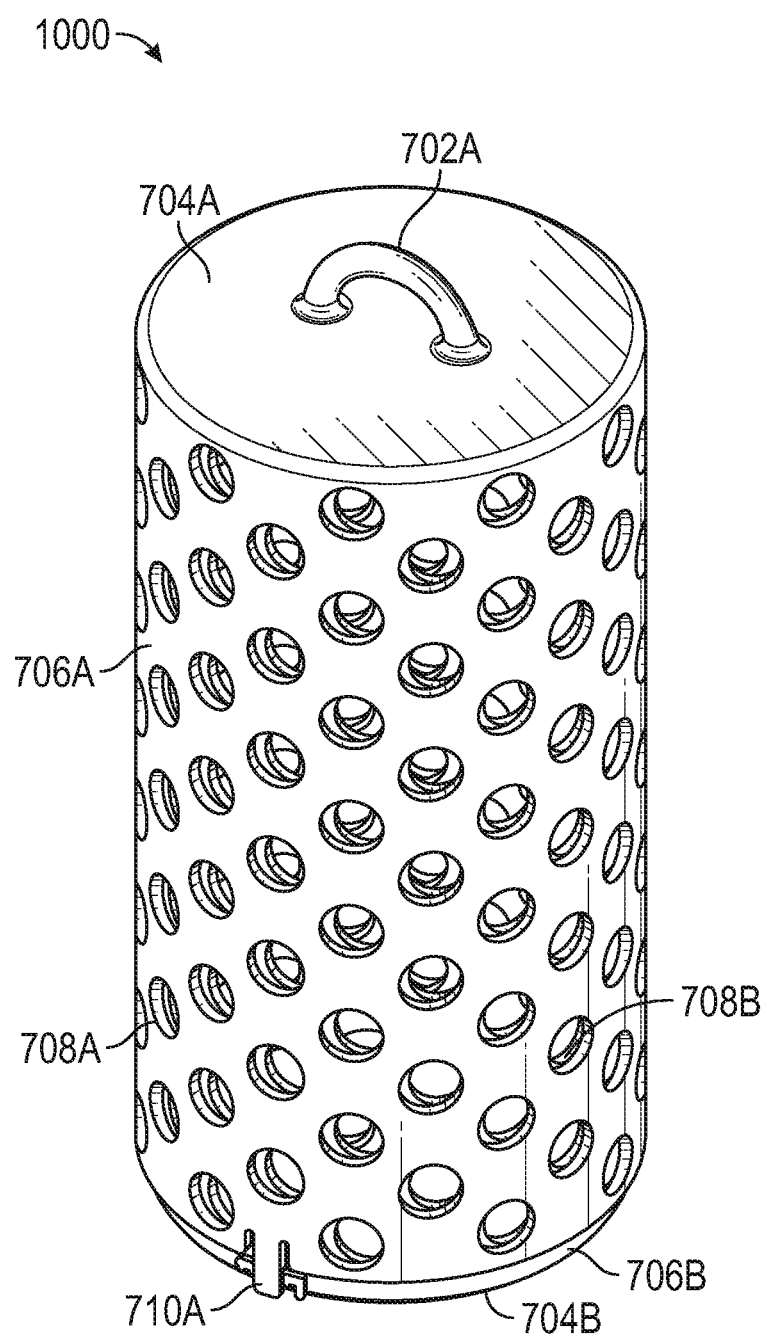
FIGS. 10A-10D illustrate the example bait container of FIGS. 9A-9D with the first insert is rotated three degrees from the second insert, according to one embodiment.
Figure 10B:
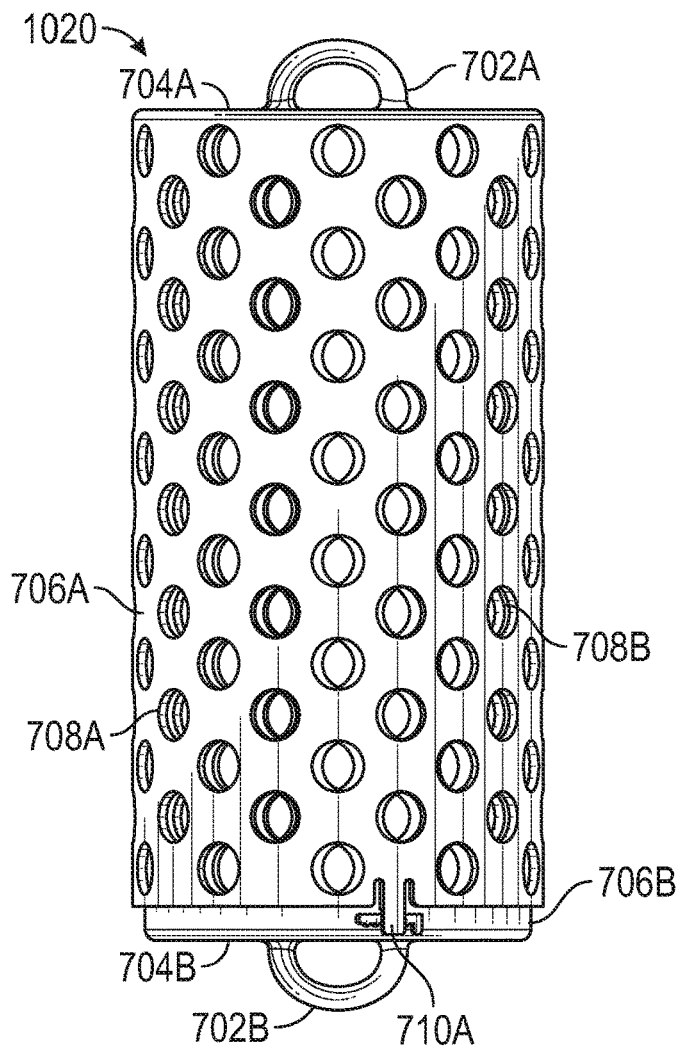
Figure 10C:
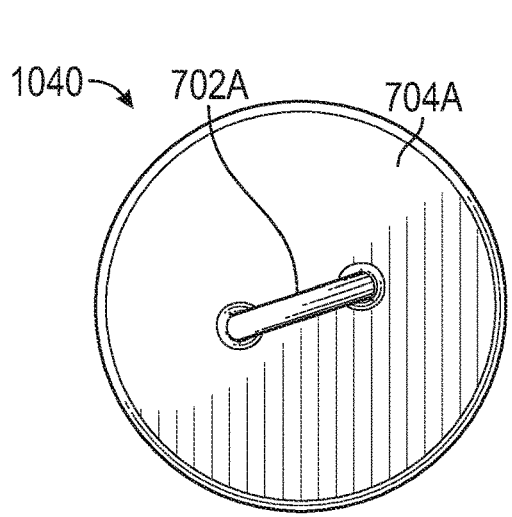
Figure 10D:
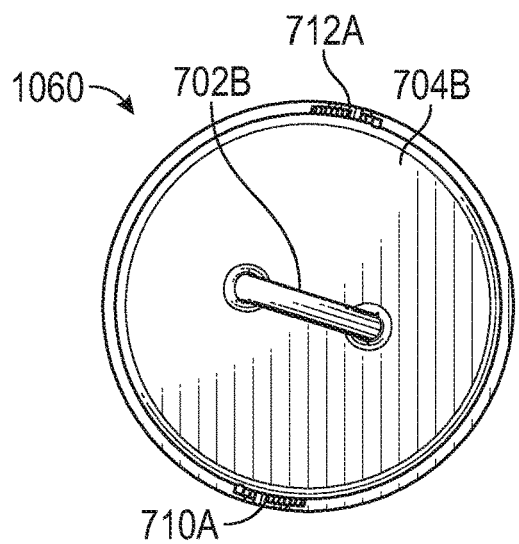

FIGS. 10A-10D illustrate the example bait container of FIGS. 9A-9D with the first insert is rotated three degrees from the second insert, according to one embodiment. FIG. 10A illustrates a perspective view of the example bait container according to one embodiment. FIG. 10B illustrates a front view of the example bait container according to one embodiment. FIG. 10C illustrates a top view of the example bait container according to one embodiment. FIG. 10D illustrates a bottom view of the example bait container according to one embodiment. As shown in FIGS. 10A-10D, the first insert 700 and the second insert 800 can be aligned such that the first insert is rotated three degrees from the second insert. Thus, the holes 708B of the second insert 800 can partially block the holes 708A of the first insert 700.

Figure 11A:
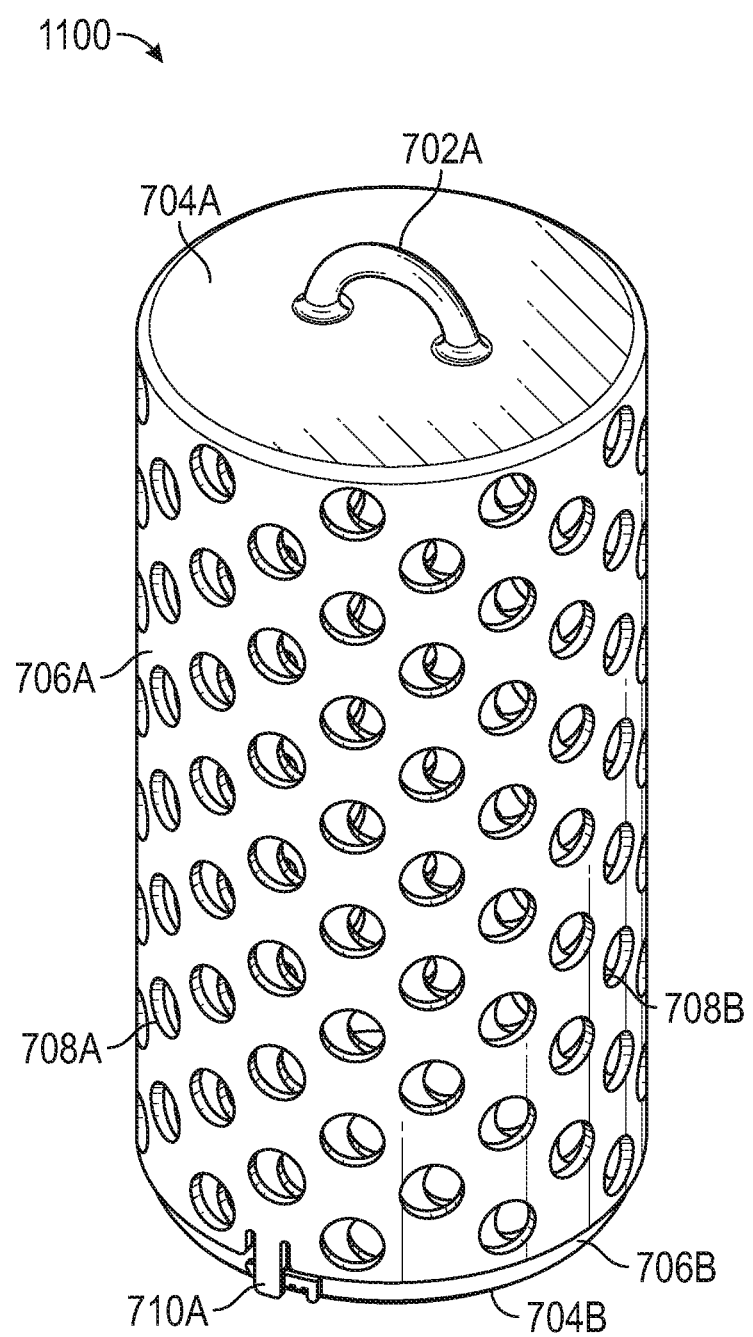
FIGS. 11A-11D illustrate the example bait container of FIGS. 9A-9D with the first insert is rotated six degrees from the second insert, according to one embodiment.
Figure 11B:
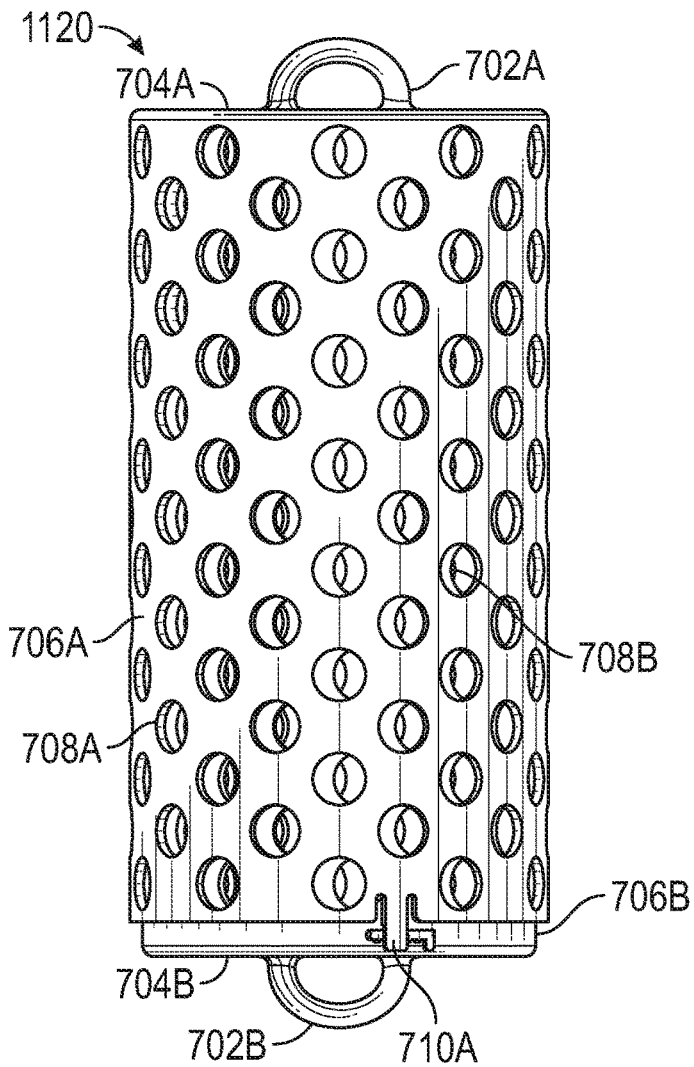
Figure 11C:
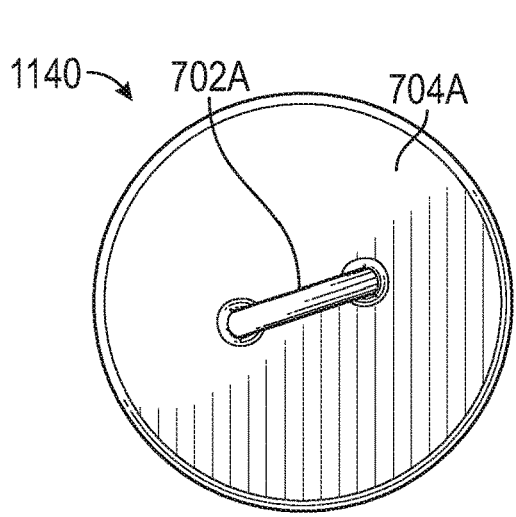
Figure 11D:
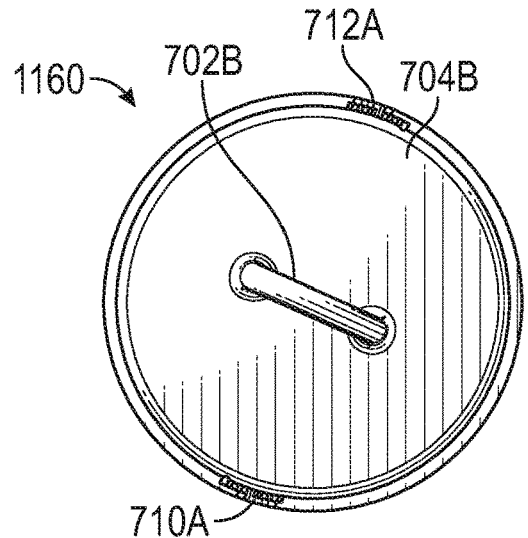

FIGS. 11A-11D illustrate the example bait container of FIGS. 9A-9D with the first insert is rotated six degrees from the second insert, according to one embodiment. FIG. 11A illustrates a perspective view of the example bait container according to one embodiment. FIG. 11B illustrates a front view of the example bait container according to one embodiment. FIG. 11C illustrates a top view of the example bait container according to one embodiment. FIG. 11D illustrates a bottom view of the example bait container according to one embodiment. As shown in FIGS. 11A-11D, the first insert 700 and the second insert 800 can be aligned such that the first insert is rotated six degrees from the second insert. Thus, the holes 708B of the second insert 800 can partially block the holes 708A of the first insert 700. The holes 708B of the second insert 800 can partially block the holes 708A of the first insert 700 in FIGS. 11A-11D more than that of FIGS. 10A-10D.

Figure 12A:
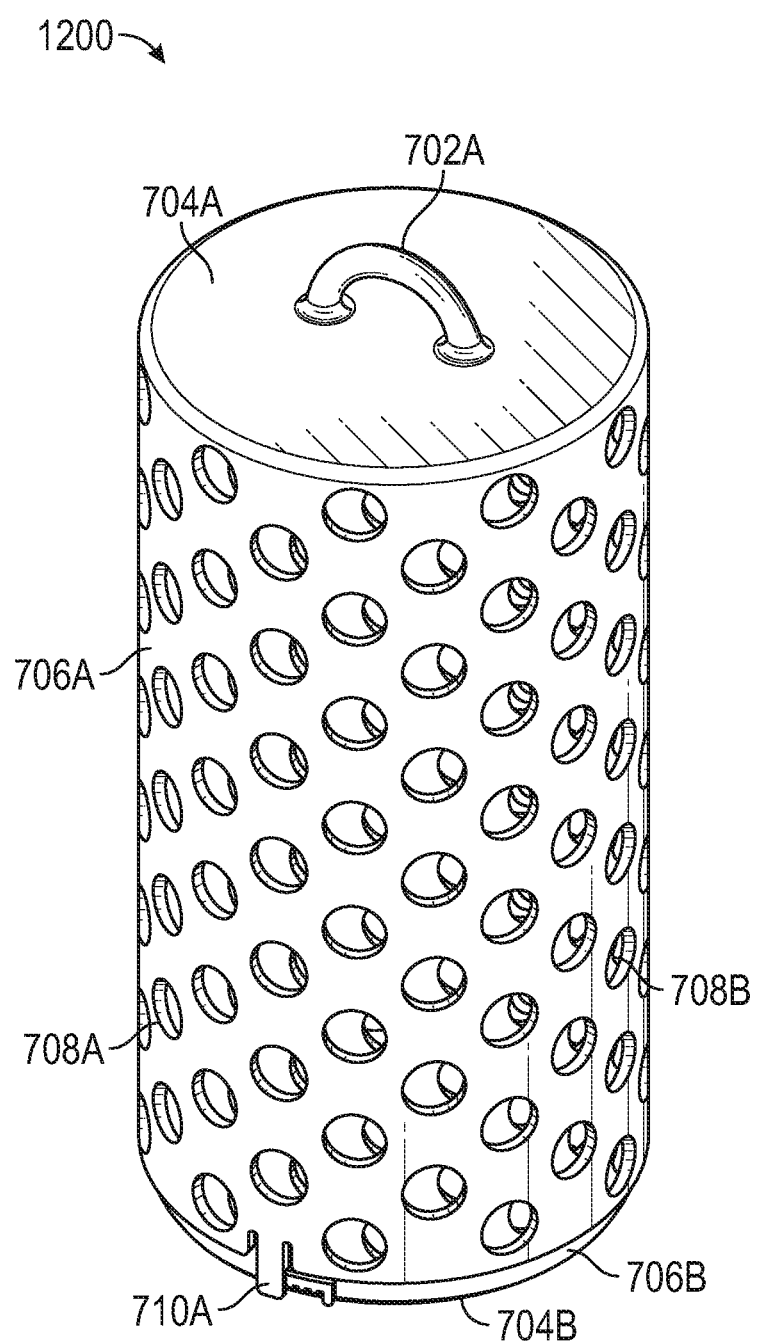

FIGS. 12A-12D illustrate the example bait container of FIGS. 9A-9D with the first insert is rotated nine degrees from the second insert, according to one embodiment. FIG. 12A illustrates a perspective view of the example bait container according to one embodiment. FIG. 12B illustrates a front view of the example bait container according to one embodiment. FIG. 12C illustrates a top view of the example bait container according to one embodiment. FIG. 12D illustrates a bottom view of the example bait container according to one embodiment. As shown in FIGS. 12A-12D, the first insert 700 and the second insert 800 can be aligned such that the first insert is rotated nine degrees from the second insert. Thus, the holes 708B of the second insert 800 can partially block the holes 708A of the first insert 700. The holes 708B of the second insert 800 can partially block the holes 708A of the first insert 700 in FIGS. 12A-12D more than that of FIGS. 10A-10D.

Figure 13A:
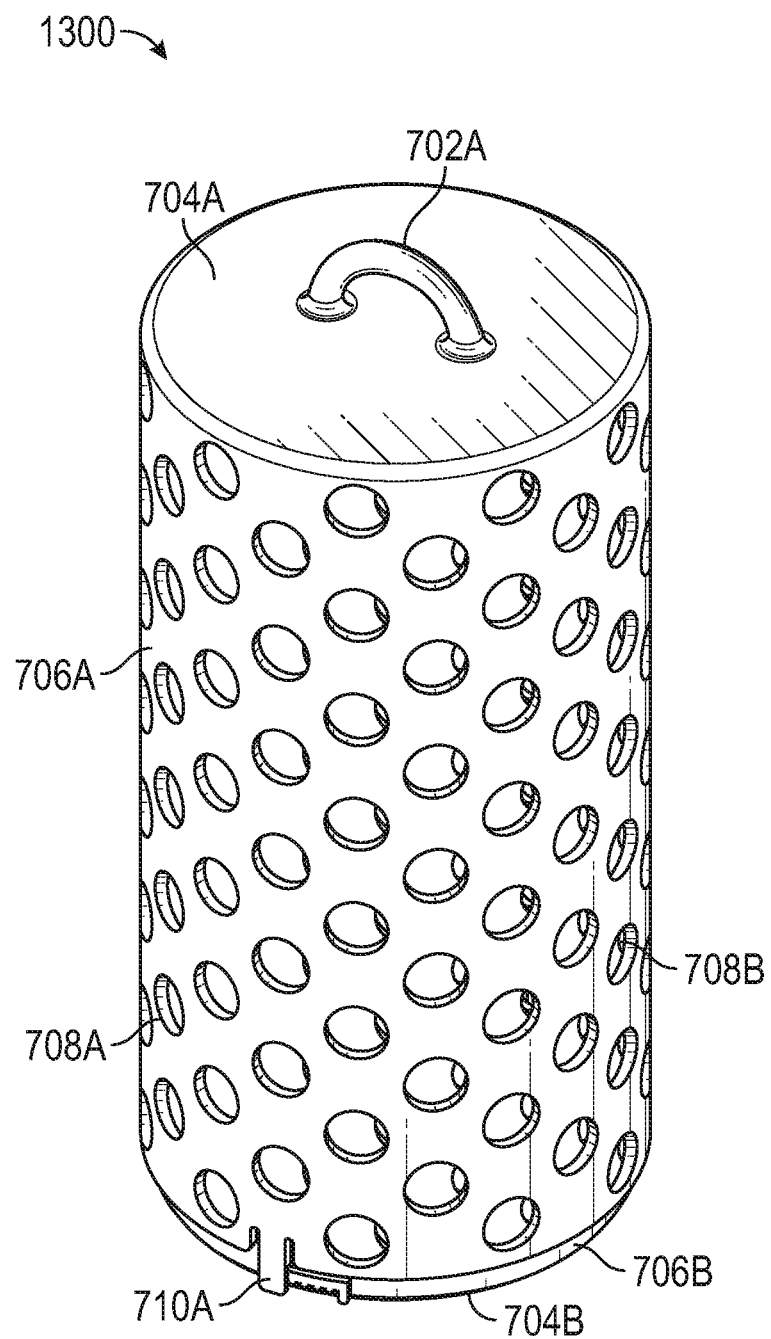

FIGS. 13A-13D illustrate the example bait container of FIGS. 9A-9D with the first insert is rotated twelve degrees from the second insert, according to one embodiment. FIG. 13A illustrates a perspective view of the example bait container according to one embodiment. FIG. 13B illustrates a front view of the example bait container according to one embodiment. FIG. 13C illustrates a top view of the example bait container according to one embodiment. FIG. 13D illustrates a bottom view of the example bait container according to one embodiment. As shown in FIGS. 13A-13D, the first insert 700 and the second insert 800 can be aligned such that the first insert is rotated twelve degrees from the second insert. Thus, the holes 708B of the second insert 800 can partially block the holes 708A of the first insert 700. The holes 708B of the second insert 800 can partially block the holes 708A of the first insert 700 in FIGS. 13A-13D more than that of FIGS. 10A-10D.

Figure 14A:
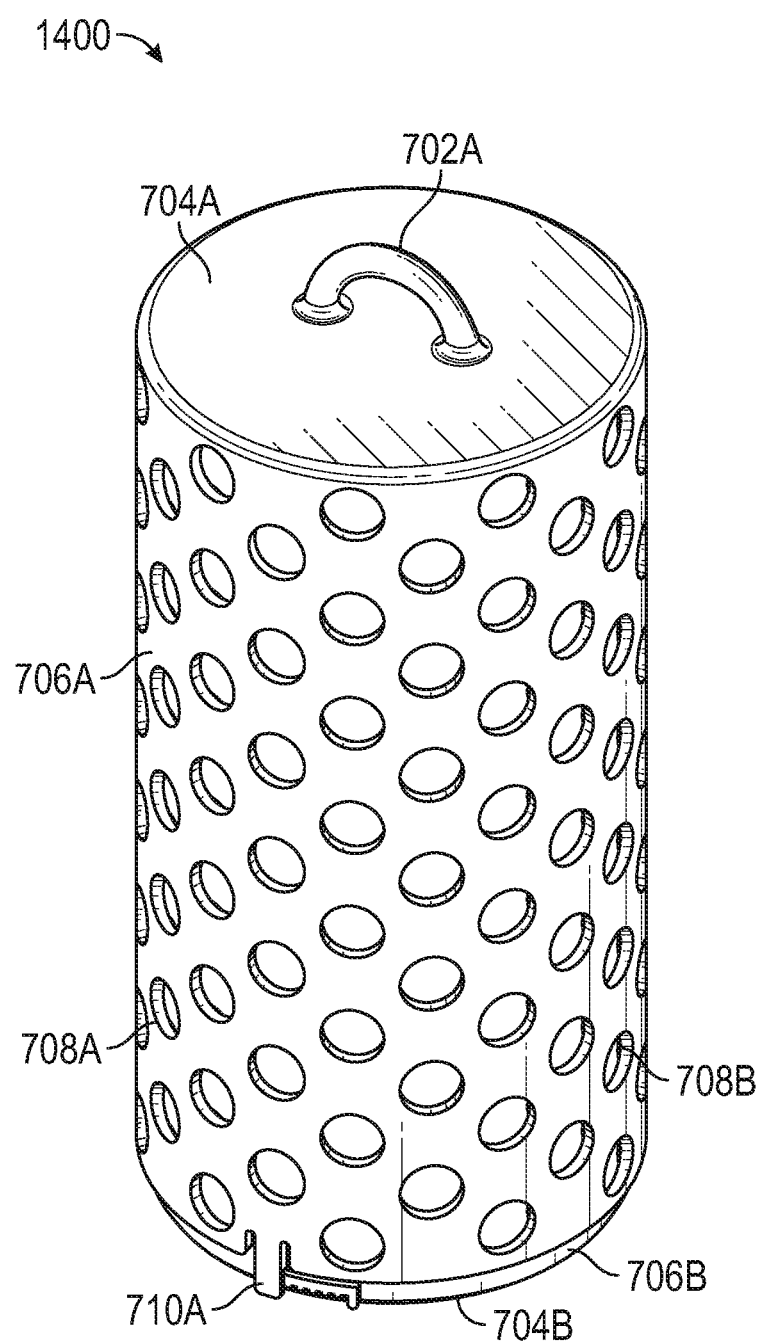

FIGS. 14A-14D illustrate the example bait container of FIGS. 9A-9D with the first insert is rotated fifteen degrees from the second insert, according to one embodiment. FIG. 14A illustrates a perspective view of the example bait container according to one embodiment. FIG. 14B illustrates a front view of the example bait container according to one embodiment. FIG. 14C illustrates a top view of the example bait container according to one embodiment. FIG. 14D illustrates a bottom view of the example bait container according to one embodiment. As shown in FIGS. 14A-14D, the first insert 700 and the second insert 800 can be aligned such that the first insert is rotated fifteen degrees from the second insert. Thus, the holes 708B of the second insert 800 can partially block the holes 708A of the first insert 700. The holes 708B of the second insert 800 can partially block the holes 708A of the first insert 700 in FIGS. 14A-14D more than that of FIGS. 10A-10D.

Bait Container with Two Inserts and a Central Sleeve

Figure 15A:
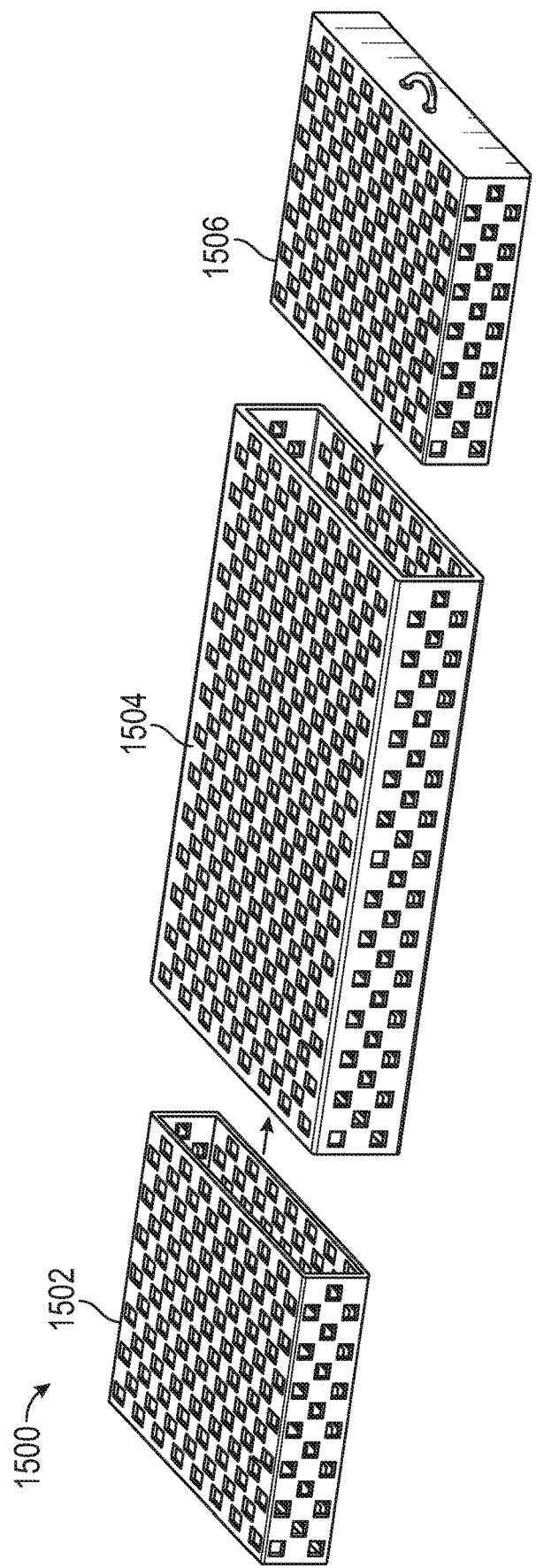
FIGS. 15A-15D illustrate an example bait container with two rectangular inserts and a central sleeve, according to one embodiment.
Figure 15B:
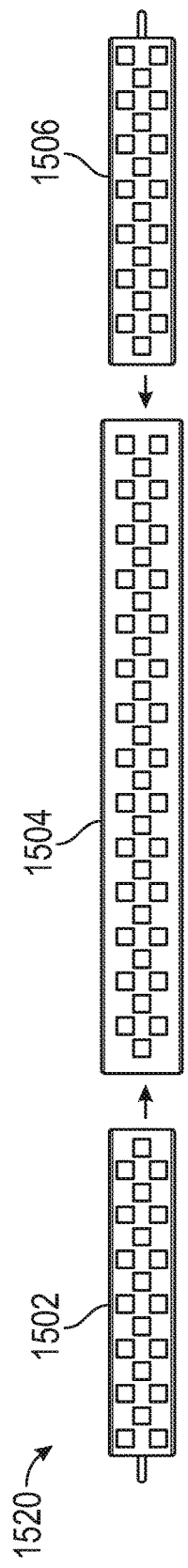
Figure 15C:
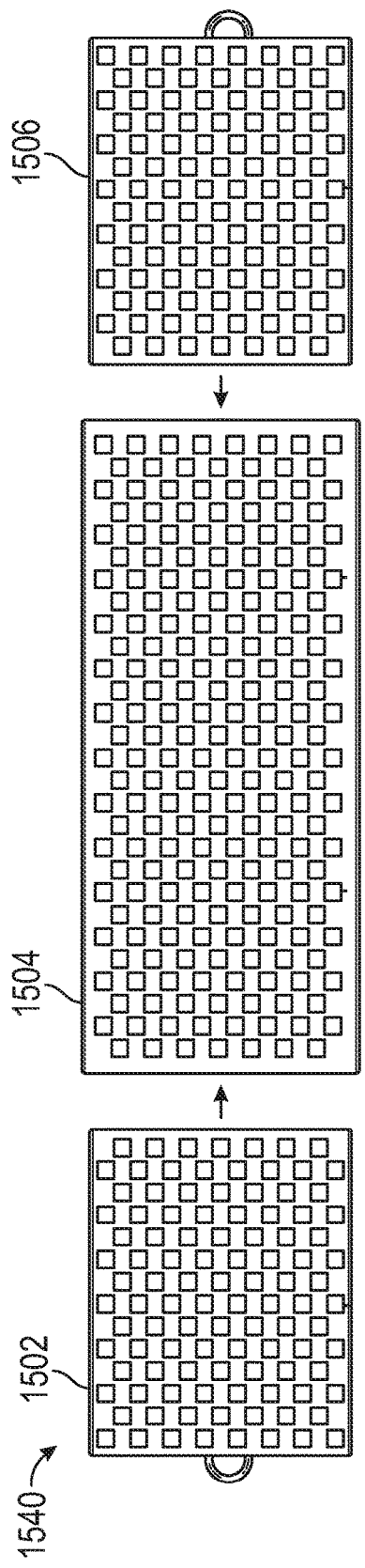
Figure 15D:
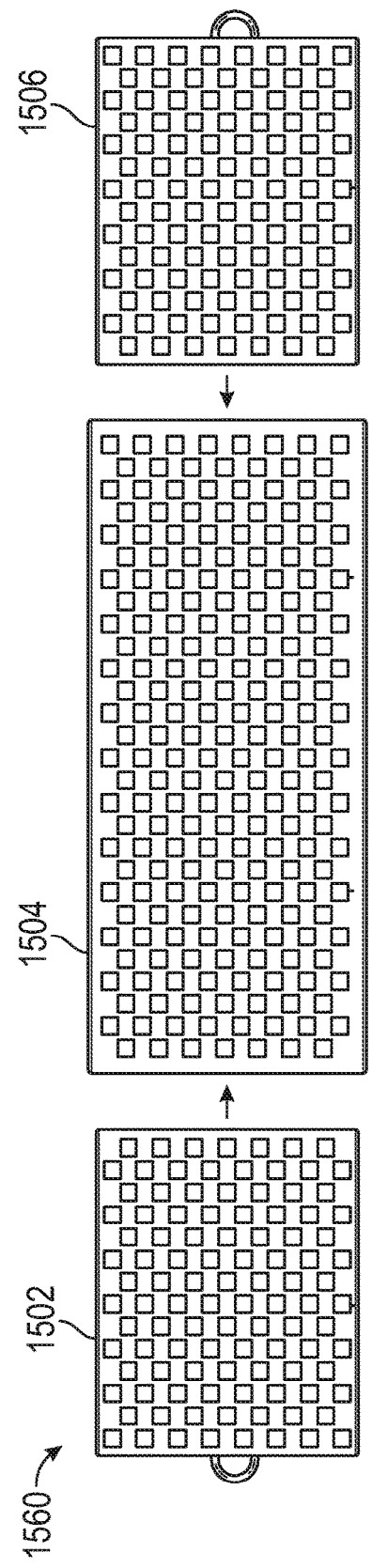

FIGS. 15A-15D illustrate an example bait container with two rectangular inserts and a central sleeve, according to one embodiment. FIG. 15A illustrates a perspective view of the example bait container according to one embodiment. FIG. 15B illustrates a front view of the example bait container according to one embodiment. FIG. 15C illustrates a top view of the example bait container according to one embodiment. FIG. 15D illustrates a bottom view of the example bait container according to one embodiment. As shown in FIGS. 15A-15D, the first insert 1502 and the second insert 1506 can be inserted into the central sleeve 1504. In some embodiments, a subset of the number of inserts can be inserted into the central sleeve. In some embodiments, the central sleeve can be inserted into one or more inserts. Advantageously, more fine tune adjustments can be made to the hole openings. Furthermore, if the inserts are inserted partially, more space can be utilized inside the bait container allowing for larger sized bait and/or more bait.

Figure 16A:
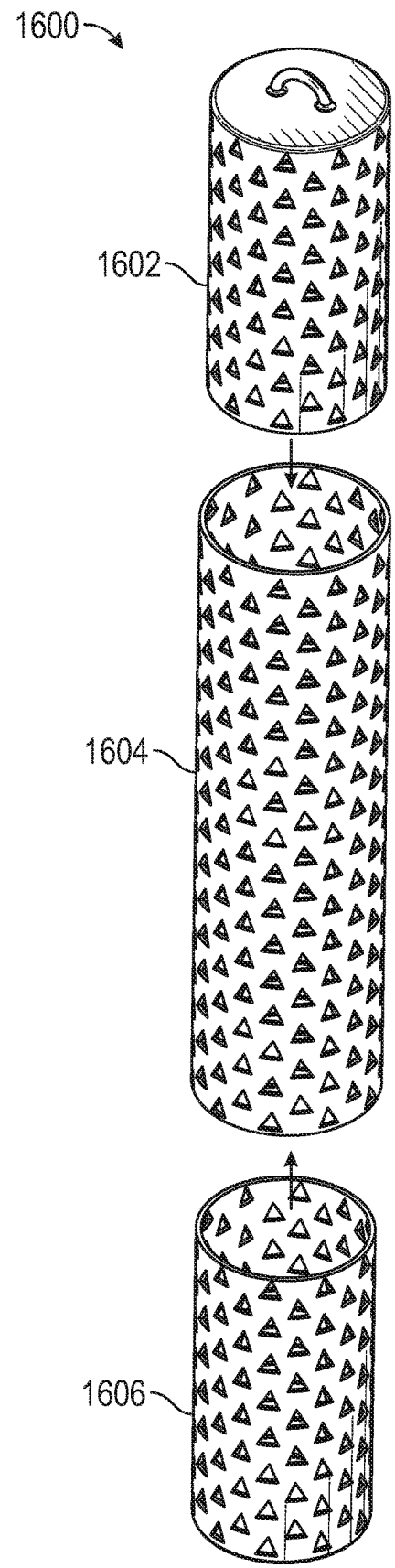
FIGS. 16A-16D illustrate an example bait container with two cylindrical inserts and a central sleeve, according to one embodiment.
Figure 16B:
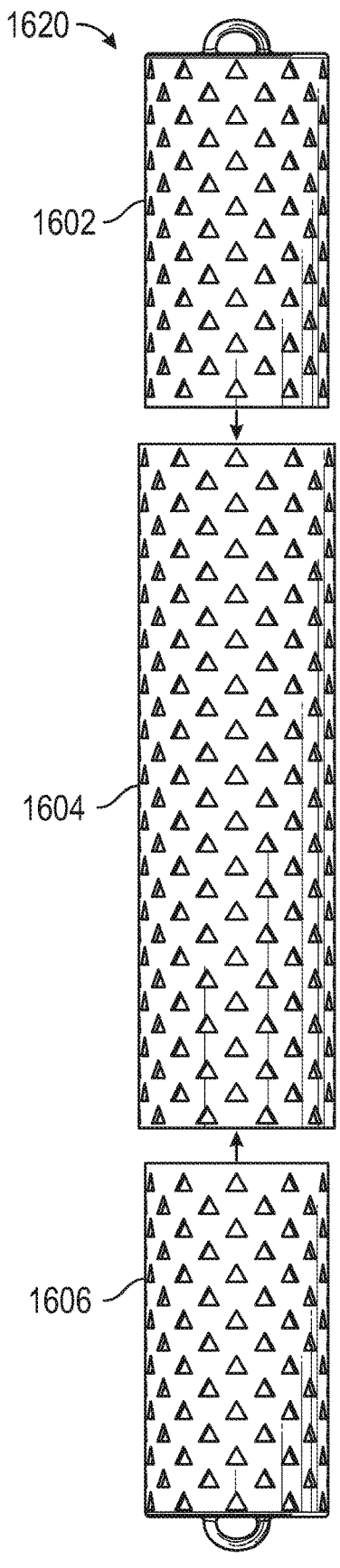
Figure 16C:
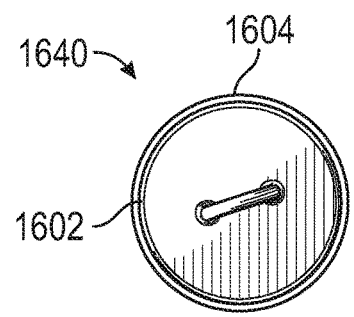
Figure 16D:
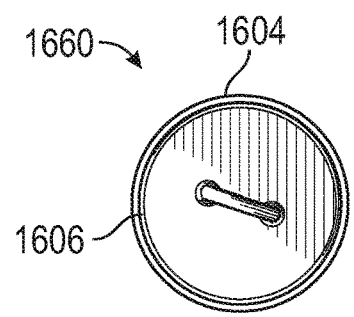

FIGS. 16A-16D illustrate an example bait container with two cylindrical inserts and a central sleeve, according to one embodiment. FIG. 16A illustrates a perspective view of the example bait container according to one embodiment. FIG. 16B illustrates a front view of the example bait container according to one embodiment. FIG. 16C illustrates a top view of the example bait container according to one embodiment. FIG. 16D illustrates a bottom view of the example bait container according to one embodiment. As shown in FIGS. 16A-16D, the first insert 1602 and the second insert 1606 can be inserted into the central sleeve 1604. In some embodiments, a subset of the number of inserts can be inserted into the central sleeve. In some embodiments, the central sleeve can be inserted into one or more inserts. Advantageously, more fine tune adjustments can be made to the hole openings. Furthermore, if the inserts are inserted partially, more space can be utilized inside the bait container allowing for larger sized bait and/or more bait.

Bait Container with Two Inserts and Holes on the Top Surface

Figure 17A:
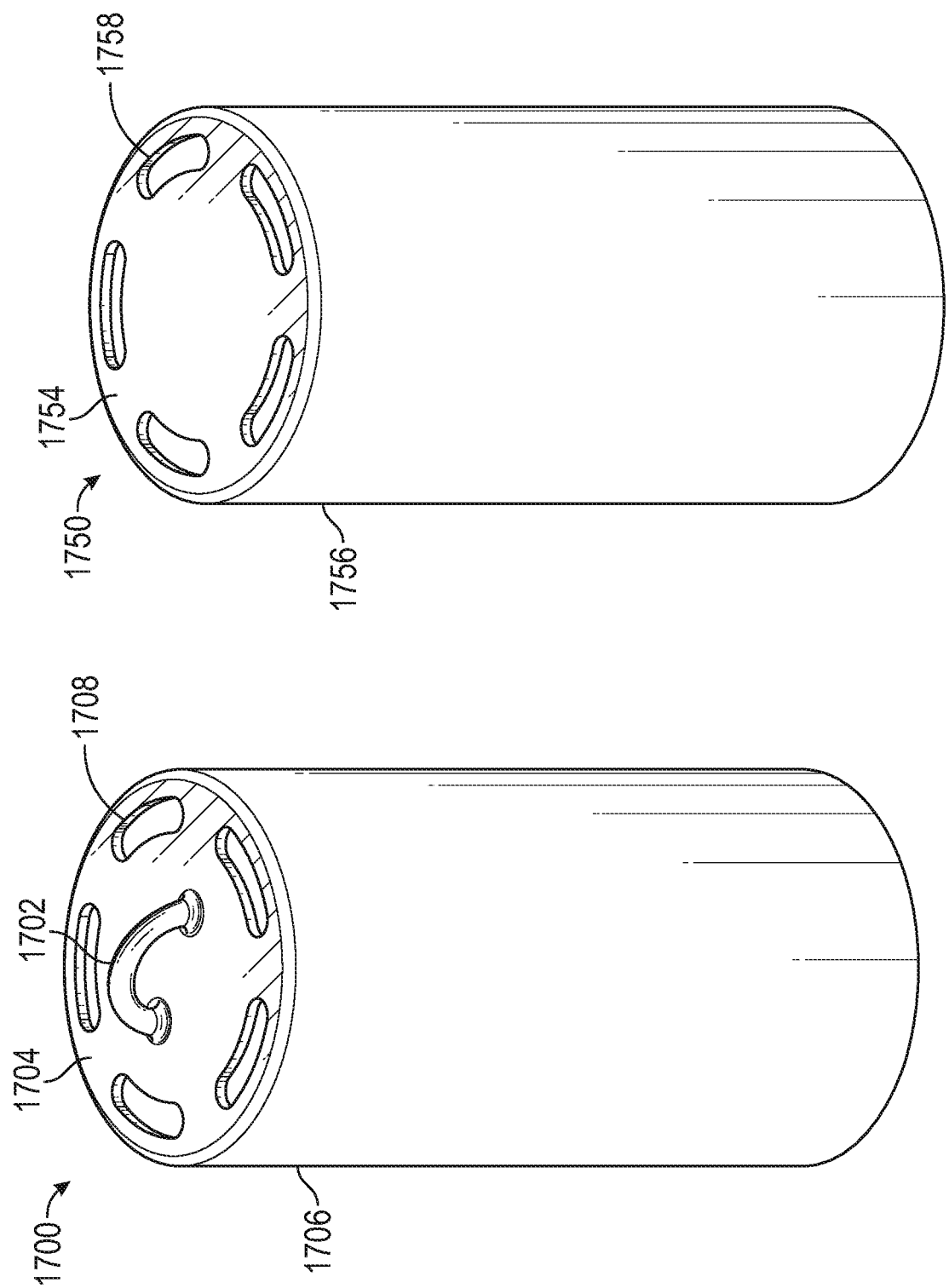
FIGS. 17A-17D illustrate an example bait container with holes located at the top surface, according to one embodiment.
Figure 17B:
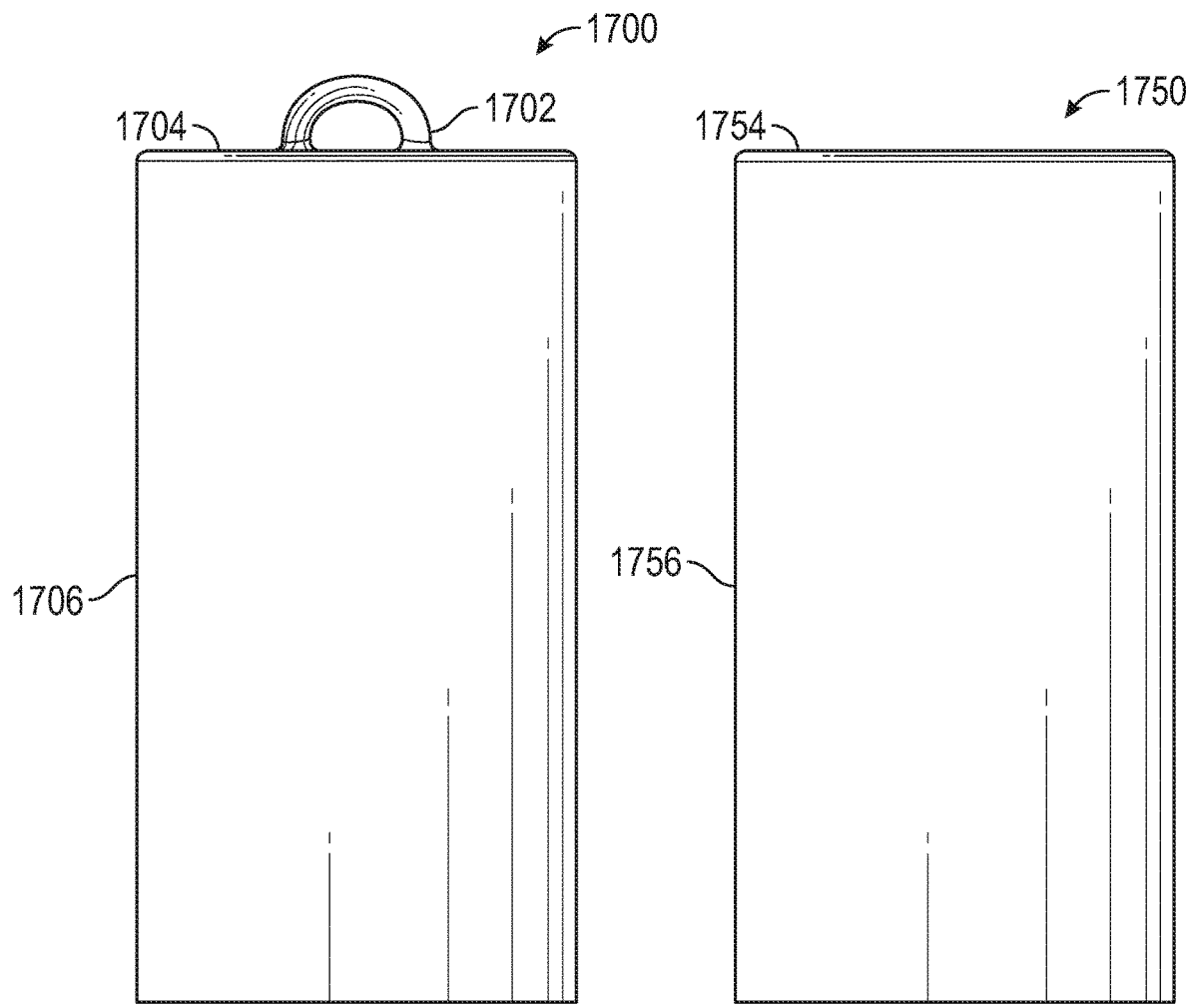
Figure 17C:
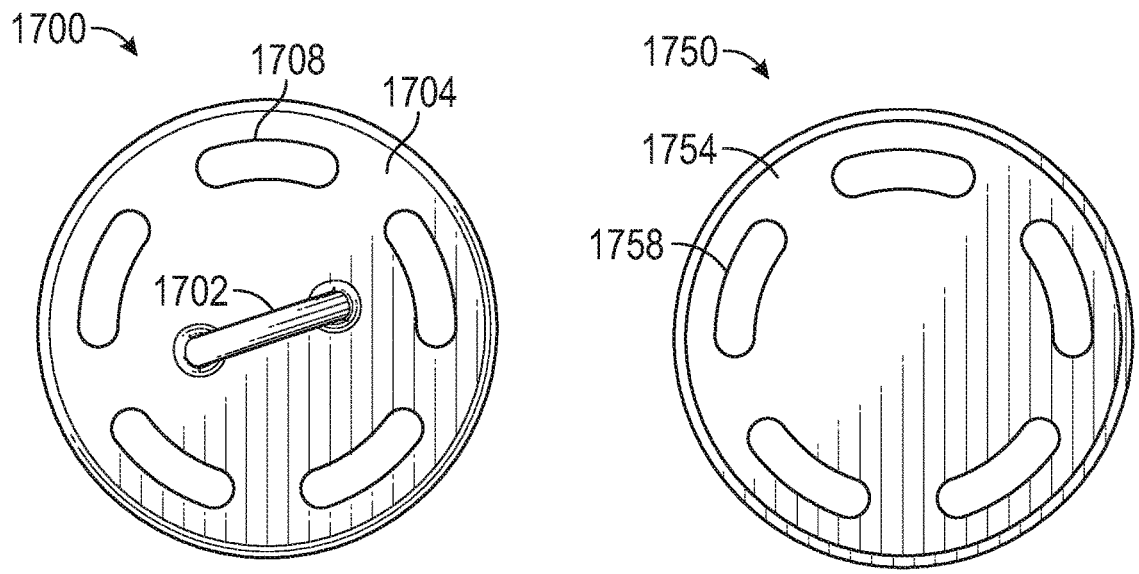
Figure 17D:
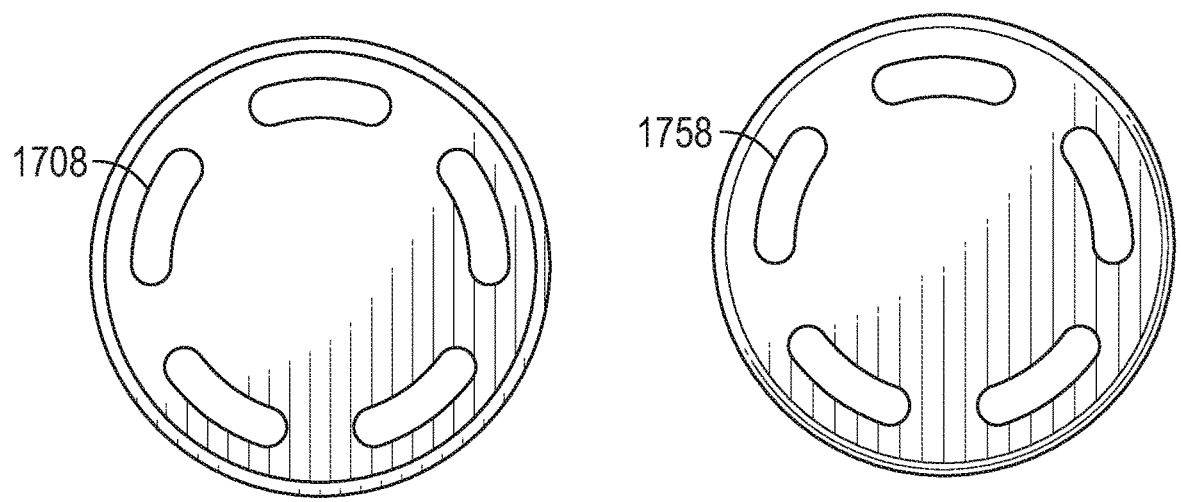

FIGS. 17A-17D illustrate an example bait container with holes located at the top surface. FIG. 17A illustrates a perspective view of the example bait container according to one embodiment. FIG. 17B illustrates a front view of the example bait container according to one embodiment. FIG. 17C illustrates a top view of the example bait container according to one embodiment. FIG. 17D illustrates a bottom view of the example bait container according to one embodiment. As shown in FIGS. 17A-17D, the top insert 1700 can be inserted into the bottom insert 1750. In some embodiments, the bottom insert 1750 can be inserted into the top insert 1700.

In some embodiments, the top insert 1700 can include a handle 1702, a top surface 1704, a side surface 1706, and/or holes 1708. In some embodiments, bottom insert 1750 can include a top surface 1754, a side surface 1756, and/or holes 1758.

In some embodiments, the handle can be used to rotate the top insert 1700 to block and/or unblock the holes 1758 of the bottom insert 1750 with the holes 1708 of the top insert 1700. In some embodiments, the holes can be located on any one or more of the surfaces of the inserts and/or sleeves. These figures illustrate a variation on the principle of rotation (or other change of relative orientation between two nesting portions) leading to a larger or smaller series of openings to the interior of space defined by two cooperating portions. In some embodiments, the elongate openings as shown here can be fully aligned (maximizing the joint opening) or not aligned (minimizing the joint opening). Alternatively, one or more partial-overlap positions can be configured. Thus, some embodiments provide for two cooperating portions that can have mechanical features that help position them with respect to each other such that openings therein overlap to a greater or lesser degree, thereby exposing the contents to a greater or lesser degree (depending on the amount of access to odors or bait portions a user such as a fisherman desires to provide). FIGS. 17A-17D illustrate how the openings can be elongate and can be configured to correspond to a relative rotation between overlapping plate portions. Such a design can apply to two nested disks, for example. The length of two nested structures can be much less than the illustrated elongate cylinders, for example.

Bait Container with a Recess and a Hook

Figure 18:
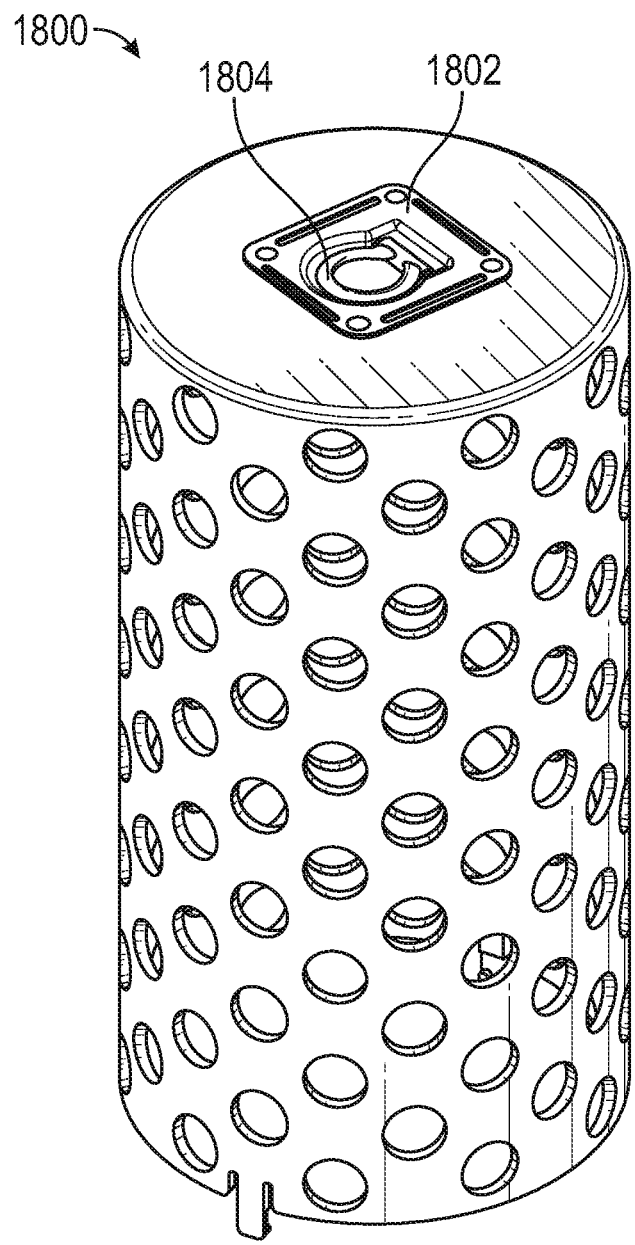
FIG. 18 illustrates a recess and a hook, according to one embodiment.

FIG. 18 illustrates a recess and a hook, according to one embodiment. In some embodiments, one or more surfaces can include a recess and/or hook. In the illustrative example of FIG. 18, the surface of the bait container can include a recess 1802 and a hook within the recess 1804. Advantageously, the bait container can be stored on the surface such that the bait container can stand upright without the hook getting in the way. The hook can be within the recess such that when the bait container is stored on the surface where the recess and hook is, the hook can be recessed enough to not protrude from the surface.

Figure 19:
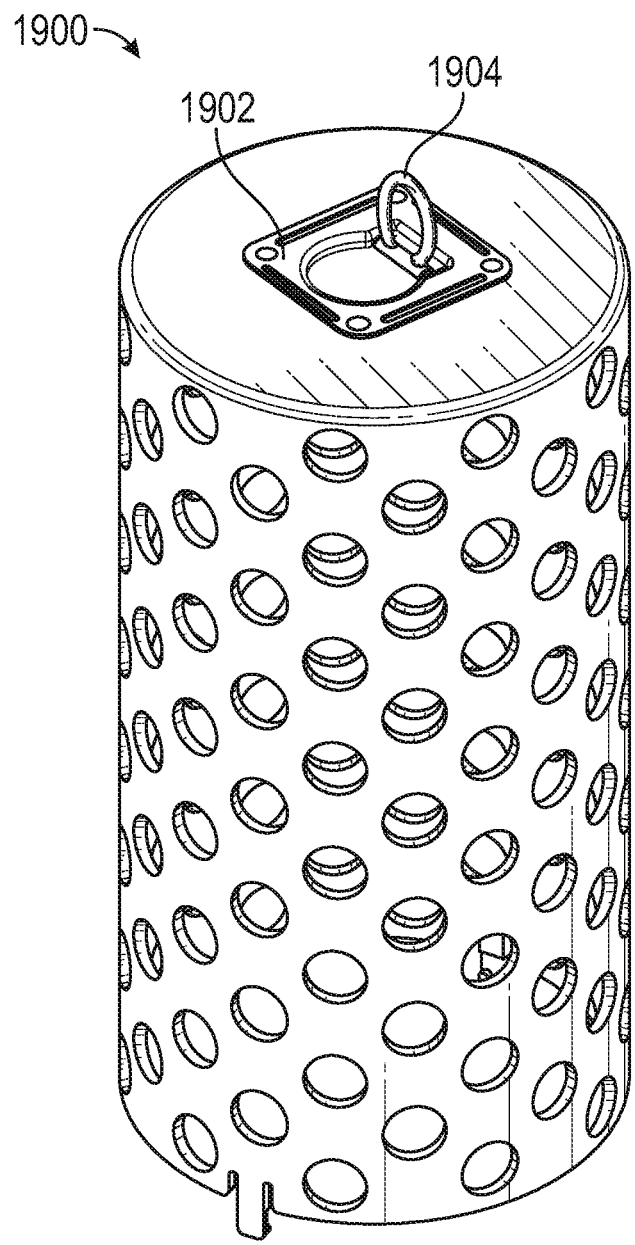
FIG. 19 illustrates a recess and an adjustable hook, according to one embodiment.

FIG. 19 illustrates a recess and an adjustable hook, according to one embodiment. The bait container can include an adjustable hook 1904 that can hinge. Advantageously, the adjustable hook 1904 can fully reside within the recess 1902 without protruding from the surface. In another configuration, the adjustable hook 1904 can hinge to protrude from the surface and allow a line and/or the like to be tied to the adjustable hook 1904.

Additional Embodiments

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated. The scope of the invention should therefore be construed in accordance with the appended claims and any equivalents thereof.

What is claimed is:

1. A method for varying the rate of multidirectional dispersion of bait from a submersible container, the method comprising:
    positioning two complimentary, attachable sleeves one within the other, each sleeve configured for a user to grasp at an enclosed end and cause the opposite, open end of each sleeve to slide together with the open end of the other sleeve, in order to form the generally enclosed submersible container;
    using a locking mechanism integrally formed with the two sleeves to attach the first and second sleeves in a first configuration, each sleeve comprising openings facing multiple directions, wherein the first configuration includes overlapping openings of the first sleeve with openings of the second sleeve to one degree to facilitate multidirectional bait dispersion at a first rate;
    disengaging the integral locking mechanism to thereby temporarily disengage the first and second attachable sleeves;
    changing an orientation of the first attachable sleeve with respect to the second attachable sleeve by at least sliding one sleeve within, and with respect to, the other; and
    reengaging the integral locking mechanism to attach the first and second sleeves in a second configuration that includes attaching the sleeves in the changed orientation and overlapping the openings of the first sleeve with the openings of the second sleeve to another degree to facilitate multidirectional bait dispersion at a second rate.

2. The method of claim 1, wherein the first configuration results in an effective opening for the bait container that is smaller than an opening on the first attachable sleeve.

3. The method of claim 1, wherein the first configuration results in an effective opening for the bait container that is smaller than both an opening on the first attachable sleeve and an opening on the second attachable sleeve.

4. The method of claim 1, wherein the first configuration results in an effective opening for the bait container that is smaller than that of the second configuration.

5. The method of claim 4 wherein a shape of the opening of the first attachment sleeve includes at least one of: a square, a triangle, a rectangle, an oval, a convex form, a concave form, a star, a pentagon, an octagon, a trapezoid, a diamond, a rhombus, a parallelogram, a hexagon, a heptagon, a nonagon, a decagon, a stadium shape, or an arched shape.

6. The method of claim 1, wherein at least one surface of the first attachable sleeve is round-shaped.

7. The method of claim 1, wherein at least one surface of the first attachable sleeve is rectangular-shaped.

8. The method of claim 1, wherein at least one surface of the first attachable sleeve is square-shaped.

9. The method of claim 1, wherein the sleeves comprise waterproof material.

10. The method of claim 1, wherein the sleeves comprise Metal, acrylonitrile butadiene styrene (ABS) or polyvinyl chloride (PVC).

11. The method of claim 1, wherein the sleeves dissolve over time.

12. The method of claim 1, wherein the bait container is used for at least one of: lobster fishing, crustacean fishing, hunting, salt water fishing, fresh water fishing, fishing in a lake, fishing in a river, offshore fishing, or inshore fishing.

13. The method of claim 1, wherein the container further includes a hook, wherein the hook is configured to attach to at least one of a line, a rope, and a zip tie.

* * * * *